United States Patent
Tooher et al.

(10) Patent No.: US 10,979,924 B2
(45) Date of Patent: Apr. 13, 2021

(54) SYSTEMS AND METHODS FOR REFERENCE SIGNAL MEASUREMENTS IN WIRELESS SYSTEMS

(71) Applicant: IDAC Holdings, Inc., Wilmington, DE (US)

(72) Inventors: J. Patrick Tooher, Montreal (CA); Paul Marinier, Montreal (CA); Tao Deng, Roslyn, NY (US); Benoit Pelletier, Roxboro (CA); Ghyslain Pelletier, Montreal (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/087,511

(22) PCT Filed: Mar. 30, 2017

(86) PCT No.: PCT/US2017/024929
§ 371 (c)(1),
(2) Date: Sep. 21, 2018

(87) PCT Pub. No.: WO2017/173033
PCT Pub. Date: Oct. 5, 2017

(65) Prior Publication Data
US 2019/0141555 A1 May 9, 2019

Related U.S. Application Data

(60) Provisional application No. 62/315,405, filed on Mar. 30, 2016, provisional application No. 62/334,788, (Continued)

(51) Int. Cl.
*H04W 24/10* (2009.01)
*H04L 5/00* (2006.01)
(Continued)

(52) U.S. Cl.
CPC .......... *H04W 24/10* (2013.01); *H04B 17/309* (2015.01); *H04L 5/0048* (2013.01);
(Continued)

(58) Field of Classification Search
CPC ... H04B 17/309; H04L 5/0048; H04L 5/0053; H04L 5/0057; H04W 24/10; H04W 72/1284
See application file for complete search history.

(56) References Cited

U.S. PATENT DOCUMENTS 9,780,971 B2   10/2017   Jongren et al.
2013/0301465 A1   11/2013   Seo et al.
(Continued)

FOREIGN PATENT DOCUMENTS

CN   103380638 A   10/2013
CN   103391126 A   11/2013
(Continued)

OTHER PUBLICATIONS

3rd Generation Partnership Project (3GPP), TS 36.211 V13.0.0, "Technical Specification Group Radio Access Network, Evolved Universal Terrestrial Radio Access (E-UTRA), Physical Channels and Modulation (Release 13)", Dec. 2015, 141 pages.
(Continued)

Primary Examiner — Saad A. Waqas
(74) Attorney, Agent, or Firm — Condo Roccia Koptiw LLP

(57) ABSTRACT

Systems, apparatuses, and methods are disclosed for receiving downlink control information (DCI) that may include an indication of a reference measurement resource (RMR), receiving an indication of a measurement configuration, and receiving an indication of a feedback resource configuration. A measurement report based on the indication of an RMR, an indication of a measurement configuration, and an indi-
(Continued)

cation of a feedback resource configuration may be generated and may be transmitted to a network device.

16 Claims, 10 Drawing Sheets

Related U.S. Application Data filed on May 11, 2016, provisional application No. 62/416,397, filed on Nov. 2, 2016.

(51) Int. Cl.
*H04B 17/309* (2015.01)
*H04W 72/12* (2009.01)

(52) U.S. Cl.
CPC .......... *H04L 5/0053* (2013.01); *H04L 5/0057* (2013.01); *H04W 72/1284* (2013.01)

(56) References Cited

U.S. PATENT DOCUMENTS

| | | | |
|---|---|---|---|
| 2014/0044040 A1* | 2/2014 | Chen | H04W 24/02 370/328 |
| 2014/0211695 A1 | 7/2014 | Cui et al. | |
| 2016/0227548 A1 | 8/2016 | Nimbalker et al. | |
| 2017/0257788 A1 | 9/2017 | Takahashi et al. | |
| 2019/0319682 A1* | 10/2019 | Zhang | H04B 7/0626 |

FOREIGN PATENT DOCUMENTS

| | | |
|---|---|---|
| EP | 2863678 A1 | 4/2015 |
| JP | 2016-021769 A | 2/2016 |
| WO | 2012/099386 A2 | 7/2012 |
| WO | WO 2014/165711 A1 | 10/2014 |
| WO | 2016/031855 A1 | 3/2016 |
| WO | WO 2016/123393 A1 | 8/2016 |

OTHER PUBLICATIONS

3rd Generation Partnership Project (3GPP), TS 36.212 V13.0.0, Technical Specification Group Radio Access Network, Evolved Universal Terrestrial Radio Access (E-UTRA), Multiplexing and Channel Coding (Release 13), Dec. 2015, 121 pages.
3rd Generation Partnership Project (3GPP), TS 36.213 V13.0.1, Technical Specification Group Radio Access Network, Evolved Universal Terrestrial Radio Access (E-UTRA), Physical Layer Procedures (Release 13), Jan. 2016, 326 pages.
3rd Generation Partnership Project (3GPP), TS 36.331 V13.0.0, Technical Specification Group Radio Access Network, Evolved Universal Terrestrial Radio Access (E-UTRA), Radio Resource Control (RRC), Protocol Specification (Release 13), Dec. 2015, 507 pages.
3rd Generation Partnership Project (3GPP), 3GPP TS 36.331 V13.0.0 "Technical Specification Group Radio Access Network, Evolved Universal Terrestrial Radio Access (E-UTRA), Radio Resource Control (RRC), Protocol Specification (Release 13)", Jan. 4, 2016.
3GPP TSG RAN WG1 #70bis, 3GPP R1-124669, RRC Parameters for Downlink CoMP, San Diego, CA, Oct. 8-12, 2012, 5 pages.
3rd Generation Partnership Project (3GPP), "Technical Specification Group Radio Access Network, Evolved Universal Terrestrial Radio Access (E-UTRA), Radio Resource Control (RRC), Protocol Specification (Release 13)", Jan. 4, 2016.
3$^{rd}$ Generation Partnership Project, "CSI Feedback Configuration for CoMP", 3GPP TSG RAN WG1 #70 R1-123467, Samsung, Qingdao, China, Aug. 13-17, 2012.

* cited by examiner

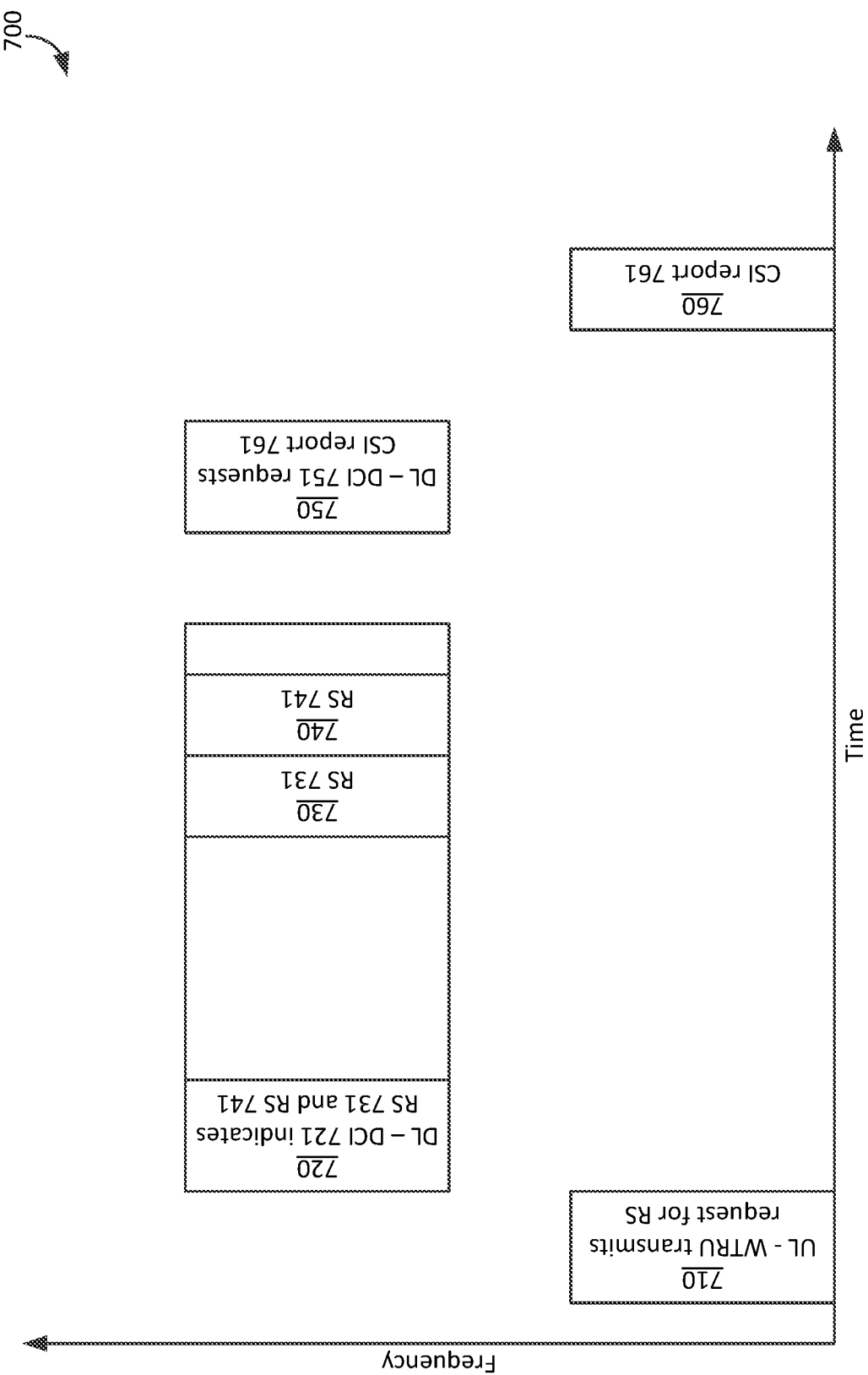

SYSTEMS AND METHODS FOR REFERENCE SIGNAL MEASUREMENTS IN WIRELESS SYSTEMS

CROSS-REFERENCE TO RELATED APPLICATIONS

This application is the National Stage entry under 35 U.S.C. § 371 of Patent Cooperation Treaty Application PCT/US2017/024929, filed Mar. 30, 2017, which claims priority to U.S. Provisional Patent Application Ser. No. 62/315,405, filed Mar. 30, 2016, U.S. Provisional Patent Application Ser. No. 62/334,788, filed May 11, 2016, and U.S. Provisional Patent Application Ser. No. 62/416,397, filed Nov. 2, 2016, each of which is entitled "Systems and Methods for Reference Signal Measurements in Wireless Systems," and each of which is incorporated herein by reference in its entirety.

BACKGROUND

Cell-specific reference signals (CRSs) may be used in wireless systems for channel estimation to perform coherent demodulation of physical channels, to acquire channel state information (CSI) for transmission modes (TMs), and/or for higher-layer measurements that may be used in cell-selection and handover decisions. It may be desired that reference signal overhead be reduced to limit unnecessary interference to neighboring transmission/reception points (TRPs) and/or to reduce power consumption at a TRP.

SUMMARY

The Summary is provided to introduce a selection of the disclosed exemplary, non-limiting concepts in a simplified form that are further described below in the Detailed Description. This Summary is not intended to identify key features and/or essential features of the claimed subject matter, nor is it intended to be used to limit the scope of the claimed subject matter.

Systems, apparatuses, and methods are disclosed for receiving downlink control information (DCI) that may include an indication of a reference measurement resource (RMR), receiving an indication of a measurement configuration, and receiving an indication of a feedback resource configuration. A measurement report based on an indication of an RMR, an indication of a measurement configuration, and/or an indication of a feedback resource configuration may be generated and may be transmitted to a network device.

An indication of an association of an RMR with at least one of a measurement configuration or a feedback resource configuration may be received. A DCI may include information that may be associated with one or more of a mobility-related measurement, a channel state information (CSI) measurement, a demodulation process, positioning, radio link monitoring, or cell acquisition. A DCI may also, or instead, include an indication of a change of an activation state of RMR. A DCI may also, or instead, include information for scheduling a transmission.

A measurement configuration may include a criterion that may be associated with down-selection of an RMR instance and/or or an RMR resource. A measurement configuration may also, or instead, include an indication of an RMR process and/or an RMR instance. A measurement configuration may also, or instead, include an indication of a measurement type and/or an indication of a measurement purpose. A measurement configuration may also, or instead, include an indication of a trigger criterion. A measurement report may be transmitted to a network device based on, or in response to, a determination based on an indication of a trigger criterion.

BRIEF DESCRIPTION OF THE DRAWINGS

The following detailed description of various non-limiting examples is provided with reference to the appended drawings. For the purposes of illustration, the drawings are provided to assist in explanation of the various non-limiting examples. The contemplated subject matter is not limited to the specific elements and/or instrumentalities described or illustrated. Absent specific notation to the contrary, no subject matter described herein is contemplated as necessary and/or essential. The described examples may be employed in any combination, in whole or in part.

FIG. 7 is a diagram of an exemplary DCI configuration and resource request process.

DETAILED DESCRIPTION

A detailed description of non-limiting examples will now be described with reference to the various figures. Although this description provides a detailed example of possible examples, it should be noted that the details are intended to be exemplary and in no way limit the scope of the application. As used herein, the article "a" or "an," absent further qualification or characterization, may be understood to mean "one or more" or "at least one," for example. Also, as used herein, the phrase "user equipment" (UE) may be understood to also refer to a "wireless transmit/receive unit" (WTRU).

Figure 1A:
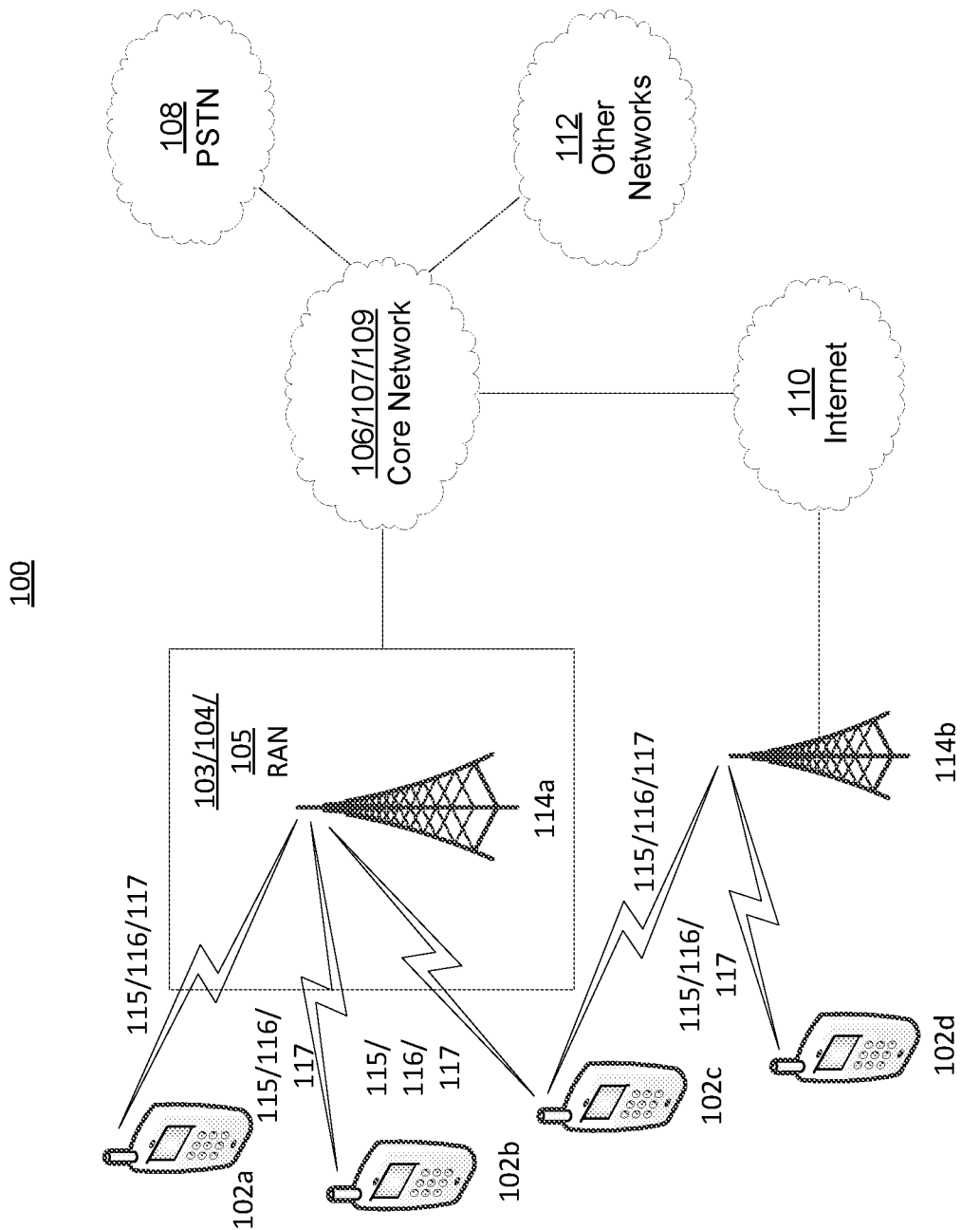
FIG. 1A is a system diagram of an example communications system in which one or more disclosed examples may be implemented.

FIG. 1A is a diagram of example communications system 100 in which one or more disclosed examples may be implemented. Communications system 100 may be a multiple access system that may provide content, such as voice, data, video, messaging, broadcast, etc., to multiple wireless users. Communications system 100 may enable multiple wireless users to access such content through the sharing of system resources, including, but not limited to, wireless bandwidth. For example, communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, communications system 100 may include wireless transmit/receive units (WTRUs) 102a, 102b, 102c, and/or 102d (that generally or collectively may be referred to herein as WTRU 102), radio access network (RAN) 103/104/105, core network 106/107/109, public switched telephone network (PSTN) 108, Internet 110, and/or other networks 112, though the disclosed examples contemplate any number of WTRUs, base stations, networks, and/or network elements. Each of WTRUs 102a, 102b, 102c, 102d may be any type of device configured to operate and/or communicate in a wireless environment. By way of example, each of WTRUs 102a, 102b, 102c, 102d may be configured to transmit and/or receive wireless signals and may be any of a user equipment (UE), a mobile station, a fixed subscriber unit, a mobile subscriber unit, a pager, a cellular telephone, a personal digital assistant (PDA), a smartphone, a laptop, a netbook, a personal computer, a wireless sensor, consumer electronics, and the like, or any combination thereof.

Communications systems 100 may also include base station 114a and base station 114b. Each of base stations 114a and 114b may be any type of device configured to wirelessly interface with at least one of WTRUs 102a, 102b, 102c, and 102d to facilitate access to one or more communication networks, such as core network 106/107/109, Internet 110, and/or other networks 112. By way of example, each of base stations 114a and 114b may be a base transceiver station (BTS), a Node-B, an eNode B, a Home Node B, a Home eNode B, a site controller, an access point (AP), a wireless router, and the like, or any combination thereof. While base stations 114a and 114b are each depicted as a single element, it is contemplated that each of base stations 114a and 114b may include any number of interconnected base stations and/or network elements.

Base station 114a may be part of RAN 103/104/105, which may also include any number of other base stations and/or network elements (not shown), such as a base station controller (BSC), a radio network controller (RNC), a relay node, etc. Base station 114a and/or base station 114b may be configured to transmit and/or receive wireless signals within a geographic region, which may be referred to as a cell. A cell may be divided into cell sectors. For example, a cell associated with the base station 114a may be divided into three cell sectors. In an example, base station 114a may include, for example, three transceivers, one for each sector of the cell associated with the base station 114a. In another example, base station 114a may employ multiple-input multiple output (MIMO) technology and may utilize multiple transceivers for each sector of the cell associated with the base station 114a.

Base stations 114a and 114b may each communicate with one or more of WTRUs 102a, 102b, 102c, and 102d over air interface 115/116/117, which may be any suitable wireless communication link (e.g., radio frequency (RF), microwave, infrared (IR), ultraviolet (UV), visible light, etc.). Air interface 115/116/117 may be established using any suitable radio access technology (RAT).

Communications system 100 may be a multiple access system and may employ one or more channel access schemes, such as CDMA, TDMA, FDMA, OFDMA, SC-FDMA, and the like. For example, base station 114a in RAN 103/104/105 and each of WTRUs 102a, 102b, and 102c may implement a radio technology such as Universal Mobile Telecommunications System (UMTS) Terrestrial Radio Access (UTRA), which may establish air interface 115/116/117 using wideband CDMA (WCDMA). WCDMA may include the use of communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another example, base station 114a and WTRUs 102a, 102b, and 102c may implement a radio technology such as Evolved UMTS Terrestrial Radio Access (E-UTRA), which may establish air interface 115/116/117 using Long Term Evolution (LTE) and/or LTE-Advanced (LTE-A).

In other examples, base station 114a and WTRUs 102a, 102b, and 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

Base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an example, base station 114b and WTRUs 102c and 102d may implement a radio technology such as IEEE 802.11 to establish a wireless local area network (WLAN). In another example, base station 114b and WTRUs 102c and 102d may implement a radio technology such as IEEE 802.15 to establish a wireless personal area network (WPAN). In yet another example, base station 114b and WTRUs 102c and 102d may utilize a cellular-based RAT (e.g., WCDMA, CDMA2000, GSM, LTE, LTE-A, etc.) to establish a picocell or femtocell. As shown in FIG. 1A, base station 114b may have a direct connection to Internet 110. Base station 114b may not be required to access Internet 110 via core network 106/107/109.

RAN 103/104/105 may be in communication with core network 106/107/109. Core network 106/107/109 may be any type of network configured to provide voice, data, applications, and/or voice over internet protocol (VoIP) services to one or more of WTRUs 102a, 102b, 102c, and 102d. For example, core network 106/107/109 may provide call control, billing services, mobile location-based services, pre-paid calling, Internet connectivity, video distribution, etc., and/or may perform high-level security functions, such as user authentication. RAN 103/104/105 and/or core network 106/107/109 may be in direct and/or indirect communication with other RANs that may employ the same RAT as RAN 103/104/105 and/or a different RAT. For example, in addition to being connected to RAN 103/104/105, which may be utilizing an E-UTRA radio technology, core network 106/107/109 may also be in communication with another RAN employing GSM radio technology.

Core network 106/107/109 may also serve as a gateway for one or more of WTRUs 102a, 102b, 102c, and 102d that may be used to access PSTN 108, Internet 110, and/or other networks 112. PSTN 108 may include circuit-switched telephone networks that may provide plain old telephone service (POTS). Internet 110 may include a global system of interconnected computer networks and devices that use common communication protocols, such as transmission control protocol (TCP), user datagram protocol (UDP), and/or internet protocol (IP) in the TCP/IP internet protocol suite. Other networks 112 may include wired and/or wireless communications networks owned and/or operated by other service providers. For example, other networks 112 may include a core network connected to one or more RANs, each of which may employ a same RAT as RAN 103/104/105 and/or a different RAT.

Some or all of WTRUs 102a, 102b, 102c, and 102d in communications system 100 may include multi-mode capabilities, e.g., each of WTRUs 102a, 102b, 102c, and 102d may include multiple transceivers for communicating with different wireless networks over different wireless links. For example, WTRU 102c shown in FIG. 1A may be configured to communicate with base station 114a, which may employ a cellular-based radio technology, and with base station 114b, which may employ an IEEE 802 radio technology.

Figure 1B:
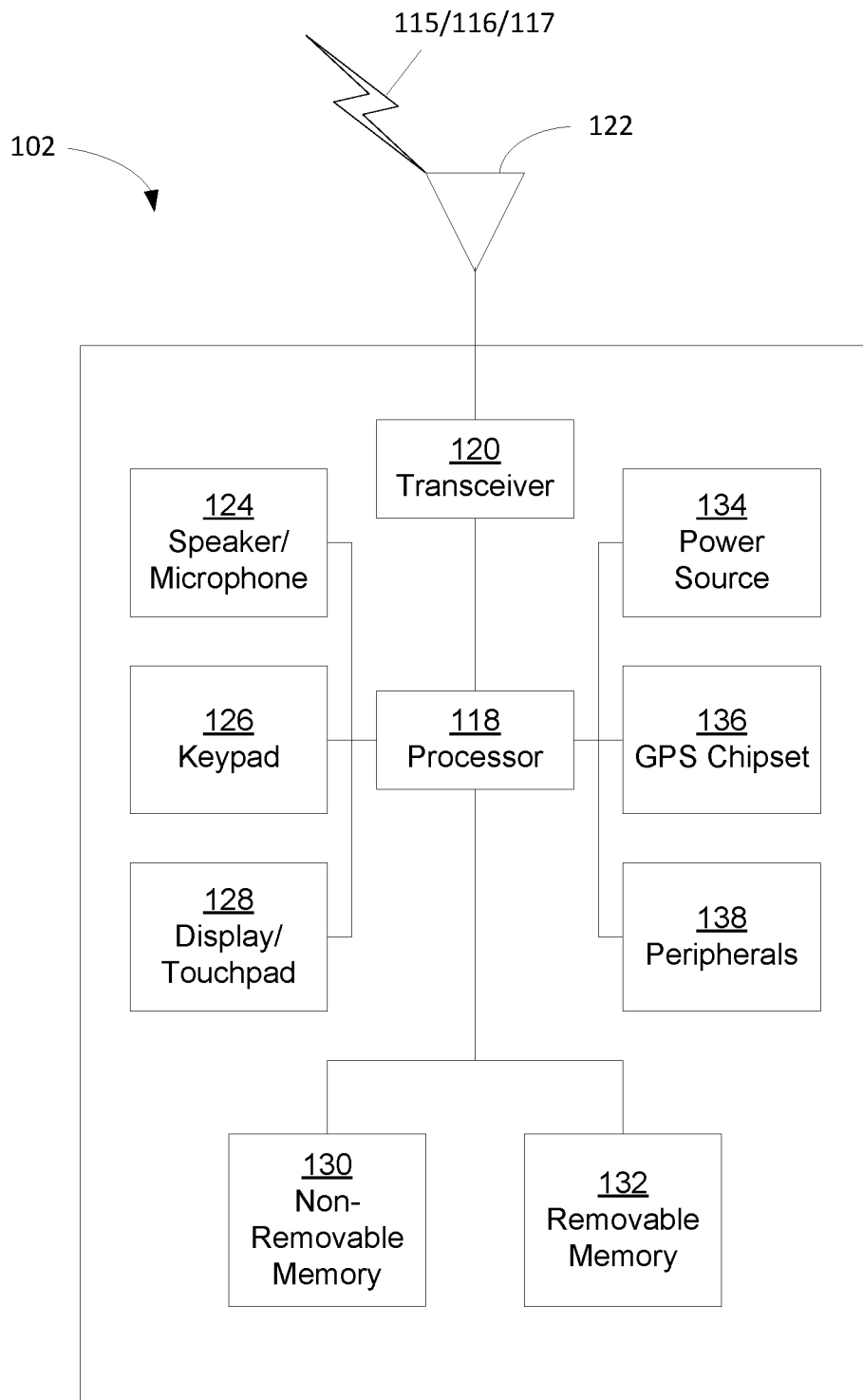
FIG. 1B is a system diagram of an example wireless transmit/receive unit (WTRU) that may be used within the exemplary communications system shown in FIG. 1A.

FIG. 1B is a system diagram of example WTRU 102, which may represent a WTRU such as any of WTRUs 102a, 102b, 102c, and 102d. As shown in FIG. 1B, WTRU 102 may include any of processor 118, transceiver 120, transmit/receive element 122, speaker/microphone 124, keypad 126, display/touchpad 128, non-removable memory 130, removable memory 132, power source 134, global positioning system (GPS) chipset 136, and other peripherals 138. WTRU 102 may include any sub-combination of the foregoing elements while remaining consistent with the disclosed examples. It is contemplated that each of base stations 114a and 114b, and/or any of the nodes that base stations 114a and 114b may represent, such as, but not limited to, a base transceiver station (BTS), a Node-B, a site controller, an access point (AP), a home node-B, an evolved home node-B (eNodeB), a home evolved node-B (HeNB), a home evolved node-B gateway, and a proxy node, among others, may include any or all of the elements depicted in FIG. 1B and described herein.

Processor 118 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type of integrated circuit (IC), a state machine, and the like, or any combination thereof. Processor 118 may perform signal coding, data processing, power control, input/output processing, and/or any other functionality that enables WTRU 102 to operate in a wireless environment. Processor 118 may be coupled to transceiver 120, which may be coupled to transmit/receive element 122. While FIG. 1B depicts processor 118 and transceiver 120 as separate components, it is contemplated that processor 118 and transceiver 120 may be integrated together in an electronic package or chip.

Transmit/receive element 122 may be configured to transmit signals to, or receive signals from, a base station (e.g., base station 114a) over air interface 115/116/117. For example, in an example, transmit/receive element 122 may be an antenna configured to transmit and/or receive RF signals. In another example, transmit/receive element 122 may be an emitter/detector configured to transmit and/or receive, e.g., IR, UV, or visible light signals. In another example, transmit/receive element 122 may be configured to transmit and/or receive both RF and light signals. Transmit/receive element 122 may be configured to transmit and/or receive any combination of wireless signals.

Transmit/receive element 122 as depicted in FIG. 1B may be a single element, however, WTRU 102 may include any number of transmit/receive elements 122. WTRU 102 may employ MIMO technology. In an example, WTRU 102 may include two or more transmit/receive elements 122 (e.g., multiple antennas) for transmitting and/or receiving wireless signals over air interface 115/116/117.

Transceiver 120 may be configured to modulate the signals that may be transmitted by transmit/receive element 122 and/or to demodulate signals that may be received by transmit/receive element 122. WTRU 102 may have multi-mode capabilities. Transceiver 120 may include multiple transceivers that may enable WTRU 102 to communicate via multiple RATs, such as UTRA and/or IEEE 802.11, for example.

Processor 118 of WTRU 102 may be coupled to, and/or may receive user input data from, speaker/microphone 124, keypad 126, and/or display/touchpad 128 (which may be, e.g., a liquid crystal display (LCD) display unit or organic light-emitting diode (OLED) display unit). Processor 118 may also output user data to speaker/microphone 124, keypad 126, and/or display/touchpad 128. Processor 118 may access information from, and/or store data in, any type of suitable memory, such as non-removable memory 130 and/or the removable memory 132. Non-removable memory 130 may include random-access memory (RAM), read-only memory (ROM), a hard disk, and/or any other type of memory storage device. Removable memory 132 may include a subscriber identity module (SIM) card, a memory stick, a secure digital (SD) memory card, and the like, or any combination thereof. Processor 118 may access information from, and/or store data in, memory that is not physically located at WTRU 102, such as memory located at a server or memory located at a home computer.

Processor 118 may receive power from power source 134 and may be configured to distribute and/or control power to the other components of WTRU 102. Power source 134 may be any suitable device for powering WTRU 102. For example, power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like, or any combination thereof.

Processor 118 may also be coupled to GPS chipset 136, which may be configured to provide location information (e.g., longitude and latitude) regarding the current location of WTRU 102. In addition to, or in lieu of, location information provided by GPS chipset 136, WTRU 102 may receive location information over air interface 115/116/117 from a base station (e.g., base stations 114a, 114b) and/or determine its location based on the timing of the signals being received from two or more nearby base stations. It will be appreciated that WTRU 102 may acquire location information by way of any suitable location-determination method while remaining consistent with the disclosed examples.

Processor 118 may further be coupled to peripherals 138, which may include one or more software and/or hardware modules that may provide additional features, functionality, and/or connectivity (wired and/or wireless). For example, peripherals 138 may include an accelerometer, an e-compass, a satellite transceiver, a digital camera (capable of capturing photographs and/or video), a universal serial bus (USB) port, a vibration device, a television transceiver, a hands-free headset, a Bluetooth® module, a frequency modulated (FM) radio unit, a digital music player, a media player, a video game player module, an Internet browser, and the like, or any combination thereof.

Figure 1C:
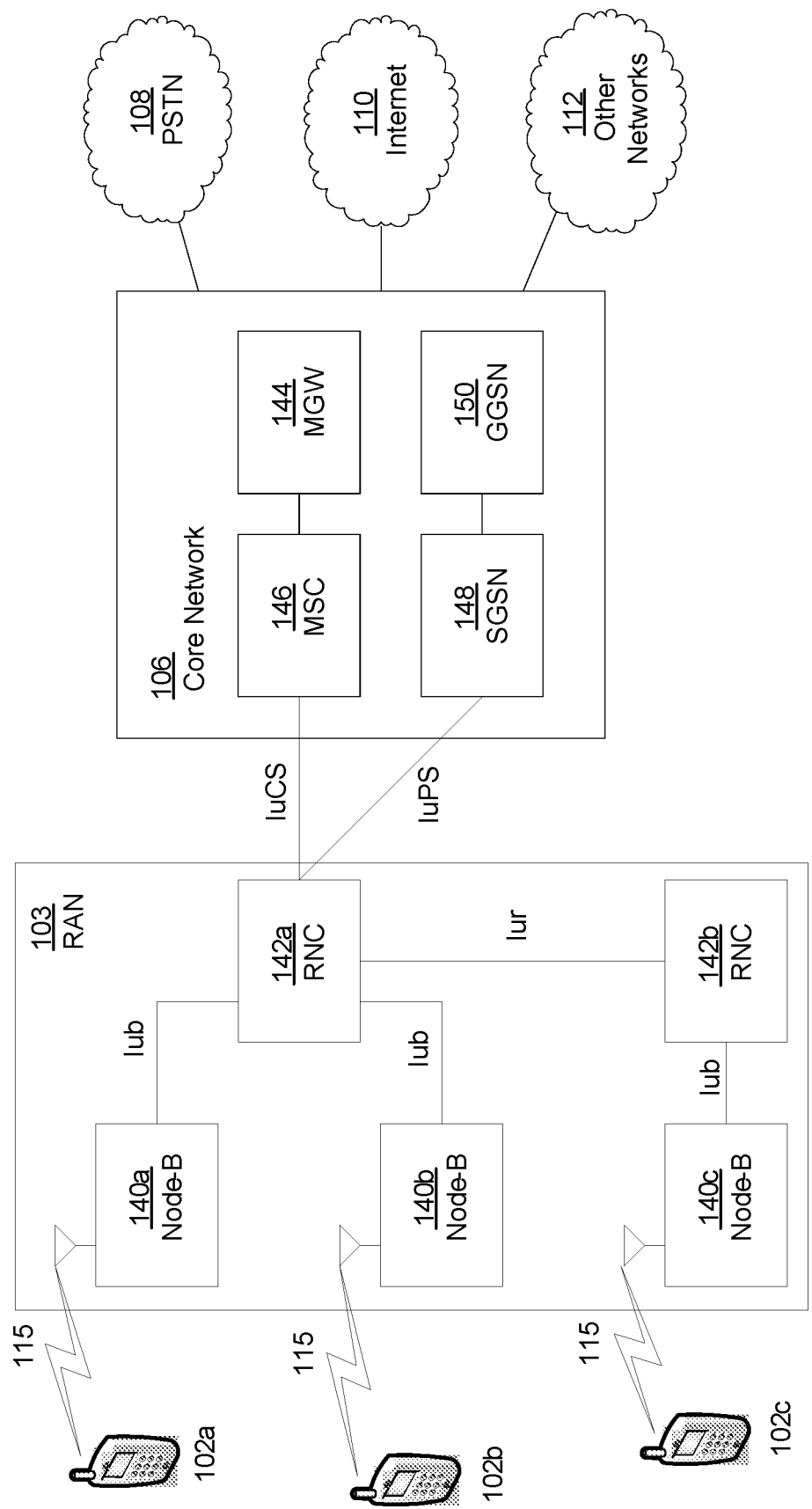
FIG. 1C is a system diagram of an example radio access network and an example core network that may be used within the exemplary communications system shown in FIG. 1A.

FIG. 1C is a system diagram of RAN 103 and core network 106 according to an example. RAN 103 may employ a UTRA radio technology to communicate with WTRUs 102a, 102b, and/or 102c over air interface 115. RAN 103 may also be in communication with core network 106. RAN 103 may include Node-Bs 140a, 140b, and/or 140c, each of which may include one or more transceivers for communicating with WTRUs 102a, 102b, and/or 102c over air interface 115. Node-Bs 140a, 140b, and 140c may each be associated with a cell within RAN 103. RAN 103 may include one or both of RNCs 142a and 142b, and/or any other RNCs. RAN 103 may include any number of Node-Bs and RNCs while remaining consistent with the contemplated examples.

Node-Bs 140a and 140b may be in communication with RNC 142a. Node-B 140c may be in communication with RNC 142b. Node-Bs 140a and 140b may communicate with RNCs 142a via an Iub interface. Node-B 140c may communicate with RNC 142b via an Iub interface. RNCs 142a and 142b may be in communication with one another via an Iur interface. Each of RNCs 142a and 142b may be configured to control the respective Node-Bs 140a, 140b, and 140c to which the RNC is connected. Each of the RNCs 142a and 142b may also, or instead, be configured to carry out and/or support other functionality, such as outer loop power control, load control, admission control, packet scheduling, handover control, macro diversity, security functions, data encryption, and the like, or any combination thereof.

Core network 106 of FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, any one or more of these elements may be owned and/or operated by an entity other than the operator of core network 106.

RNC 142a in RAN 103 may be connected to MSC 146 in core network 106 via an IuCS interface. MSC 146 may be connected to MGW 144. MSC 146 and the MGW 144 may provide WTRUs 102a, 102b, and/or 102c with access to circuit-switched networks, such as PSTN 108, to facilitate communications between WTRUs 102a, 102b, and/or 102c and traditional land-line communications devices.

RNC 142a in RAN 103 may be connected to SGSN 148 in core network 106 via an IuPS interface. SGSN 148 may be connected to GGSN 150. SGSN 148 and/or GGSN 150 may provide WTRUs 102a, 102b, and/or 102c with access to packet-switched networks, such as Internet 110, to facilitate communications between and WTRUs 102a, 102b, and/or 102c and IP-enabled devices.

As noted above, core network 106 may also be connected to other networks 112 that may include other wired and/or wireless networks that may be owned and/or operated by other service providers.

Figure 1D:
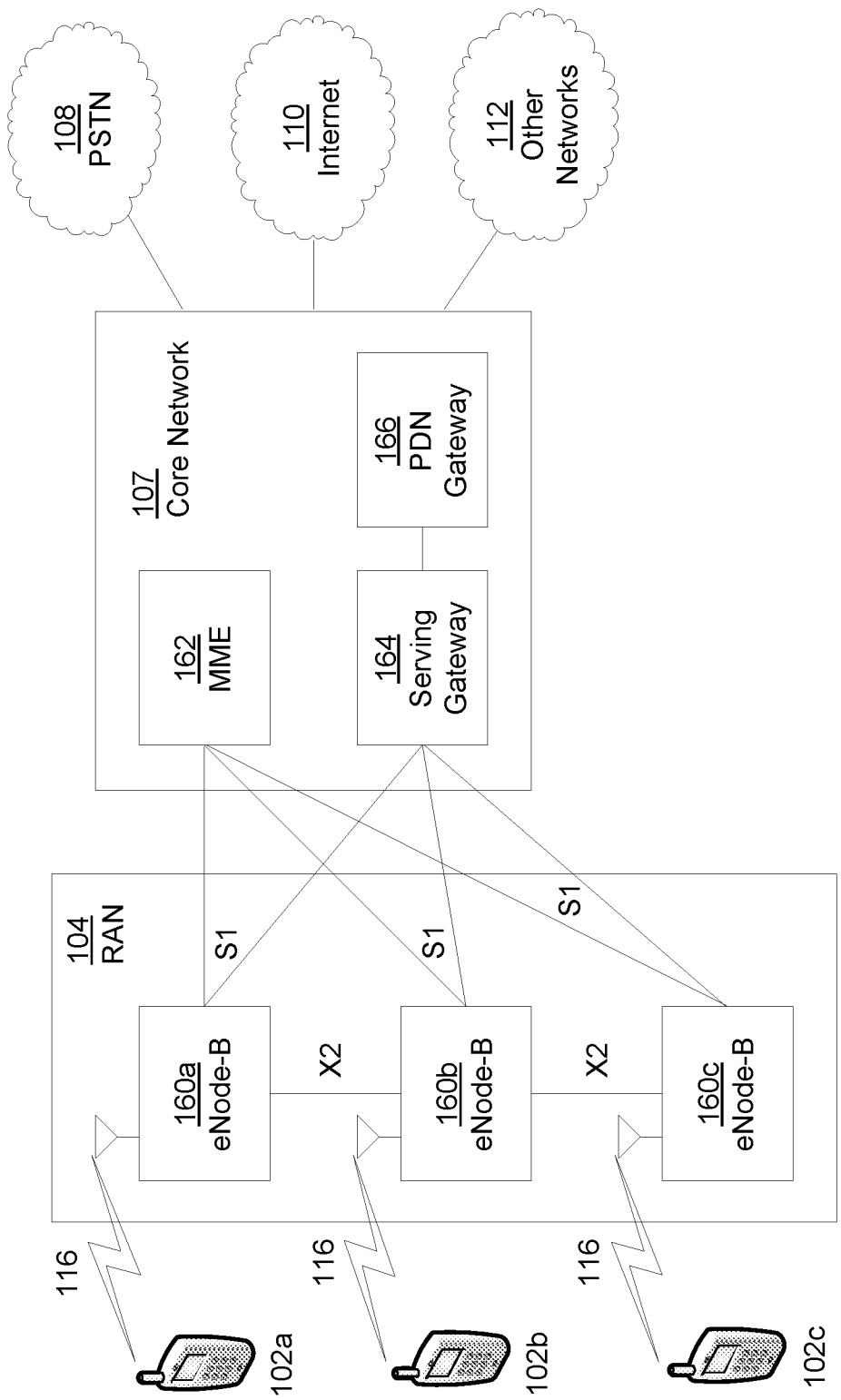
FIG. 1D is a system diagram of another example radio access network and another example core network that may be used within the exemplary communications system shown in FIG. 1A.

FIG. 1D is a system diagram of RAN 104 and core network 107 according to an example. RAN 104 may employ an E-UTRA radio technology to communicate with WTRUs 102a, 102b, and/or 102c over air interface 116. RAN 104 may also, or instead, be in communication with core network 107.

RAN 104 may include eNode-Bs 160a, 160b, and/or 160c, though it is contemplated that RAN 104 may include any number of eNode-Bs while remaining consistent with the disclosed examples. eNode-Bs 160a, 160b, and 160c may each include one or more transceivers for communicating with WTRUs 102a, 102b, and/or 102c over air interface 116. In an example one or more of eNode-Bs 160a, 160b, and 160c may implement MIMO technology. eNode-B 160a, for example, may use multiple antennas to transmit wireless signals to, and/or receive wireless signals from, WTRU 102a.

Each of the eNode-Bs 160a, 160b, and 160c may be associated with a cell and/or may be configured to handle radio resource management decisions, handover decisions, scheduling of users in the uplink and/or downlink, and the like, or any combination thereof eNode-Bs 160a, 160b, and/or 160c may each communicate with one another over an X2 interface.

Core network 107 of FIG. 1D may include a mobility management gateway (MME) 162, a serving gateway 164, and/or a packet data network (PDN) gateway 166. Although each of these elements may be part of core network 107, it is contemplated that any one or more of these elements may be owned and/or operated by an entity other than the core network operator.

MME 162 may be connected to one or more of eNode-Bs 160a, 160b, and 160c in RAN 104 via an S1 interface and/or may serve as a control node. For example, MME 162 may be responsible for authenticating users of one or more of WTRUs 102a, 102b, and 102c, bearer activation/deactivation, selecting a serving gateway during an initial attach of WTRUs 102a, 102b, and/or 102c, and the like, or any combination thereof. MME 162 may provide a control plane function for switching between RAN 104 and other RANs that may employ other radio technologies, such as GSM or WCDMA.

Serving gateway 164 may be connected to one or more of eNode-Bs 160a, 160b, and 160c in RAN 104 via an S1 interface. Serving gateway 164 may route and/or forward user data packets to and/or from WTRUs 102a, 102b, and/or 102c. Serving gateway 164 may also, or instead, perform other functions, such as anchoring user planes during inter-eNode B handovers, triggering paging when downlink data is available for WTRUs 102a, 102b, and/or 102c, managing and/or storing contexts of WTRUs 102a, 102b, and/or 102c, and the like, or any combination thereof.

Serving gateway 164 may be connected to PDN gateway 166, which may provide WTRUs 102a, 102b, and/or 102c with access to packet-switched networks, such as Internet 110, to facilitate communications between WTRUs 102a, 102b, and/or 102c and IP-enabled devices.

Core network 107 may facilitate communications with other networks. For example, core network 107 may provide WTRUs 102a, 102b, and/or 102c with access to circuit-switched networks, such as PSTN 108, to facilitate communications between WTRUs 102a, 102b, and/or 102c and traditional land-line communications devices. Core network 107 may include, and/or may communicate with, an IP gateway (e.g., an IP multimedia subsystem (IMS) server) that may serve as an interface between core network 107 and PSTN 108. Core network 107 may provide WTRUs 102a, 102b, and/or 102c with access to other networks 112, which may include other wired and/or wireless networks that may be owned and/or operated by other service providers.

Figure 1E:
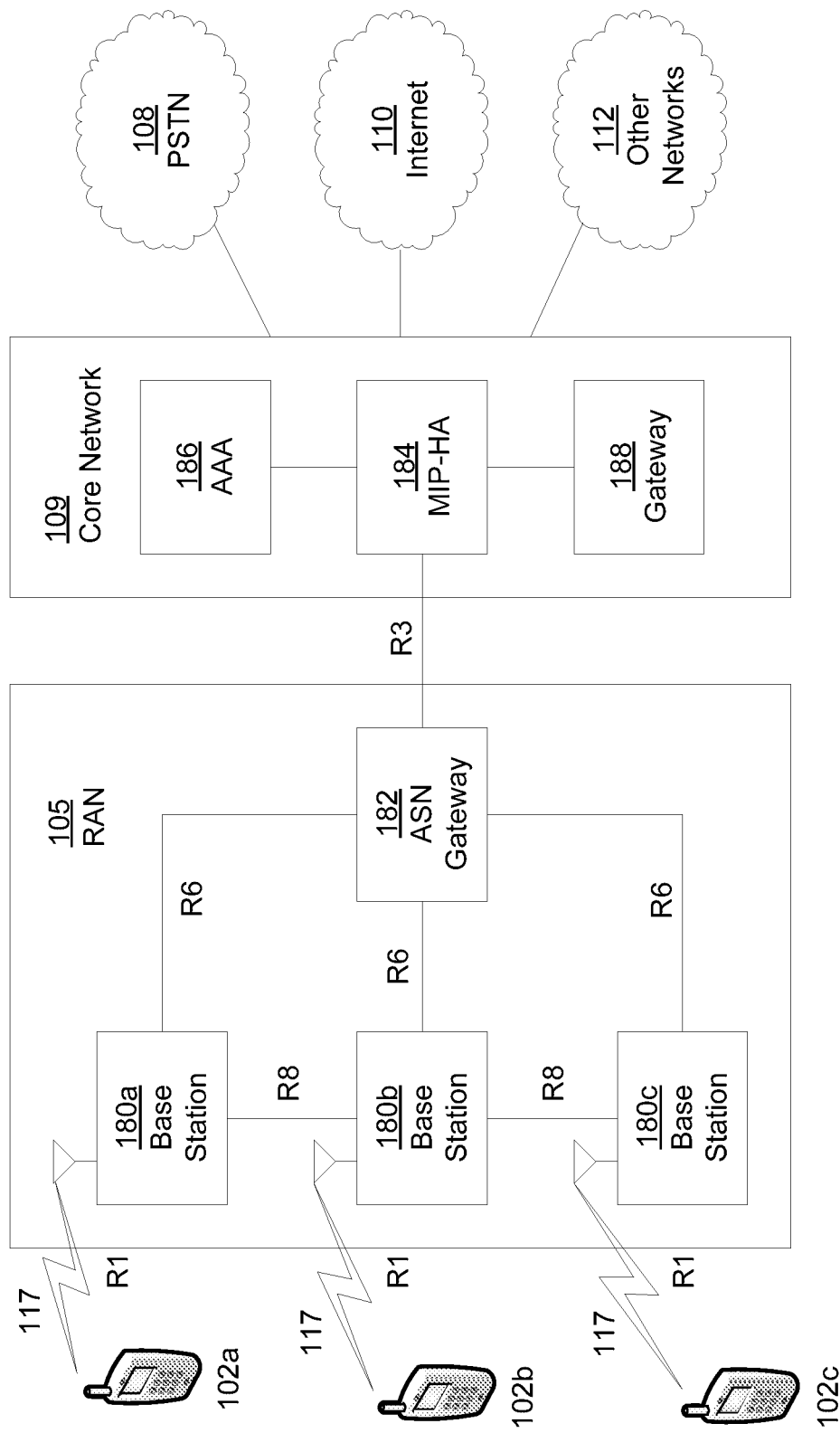
FIG. 1E is a system diagram of another example radio access network and another example core network that may be used within the exemplary communications system shown in FIG. 1A.

FIG. 1E is a system diagram of RAN 105 and core network 109 according to an example. RAN 105 may be an access service network (ASN) that may employ IEEE 802.16 radio technology to communicate with one or more of WTRUs 102a, 102b, and 102c over air interface 117. Communication links between the different functional entities of WTRUs 102a, 102b, and 102c, RAN 105, and core network 109 may be defined as reference points.

RAN 105 may include base stations 180a, 180b, and/or 180c, and/or ASN gateway 182, although it is contemplated that RAN 105 may include any number of base stations and/or ASN gateways while remaining consistent with the disclosed examples. Base stations 180a, 180b, and 180c may each be associated with a cell in RAN 105 and/or may each include one or more transceivers for communicating with WTRUs 102a, 102b, and/or 102c over air interface 117. In an example, base stations 180a, 180b, and/or 180c may implement MIMO technology. Base station 180a, for example, may use multiple antennas to transmit wireless signals to, and/or receive wireless signals from, WTRU 102a. Base stations 180a, 180b, and/or 180c may also provide mobility management functions, such as handoff triggering, tunnel establishment, radio resource management, traffic classification, quality of service (QoS) policy enforcement, and the like, or any combination thereof. ASN gateway 182 may serve as a traffic aggregation point and/or may be responsible for paging, caching of subscriber profiles, routing to the core network 109, and the like, or any combination thereof.

Air interface 117 between WTRUs 102a, 102b, and/or 102c and RAN 105 may be defined as an R1 reference point that may implement the IEEE 802.16 specification. One or more of WTRUs 102a, 102b, and/or 102c may establish a logical interface with core network 109. A logical interface between the WTRUs 102a, 102b, and/or 102c and core network 109 may be defined as an R2 reference point (not shown), which may be used for authentication, authorization, IP host configuration management, and/or mobility management, or any combination thereof.

A communication link between any of base stations 180a, 180b, and 180c may be defined as an R8 reference point that may include protocols for facilitating WTRU handovers and/or the transfer of data between base stations. A communication link between base stations 180a, 180b, and/or 180c and ASN gateway 182 may be defined as an R6 reference point. An R6 reference point may include protocols for facilitating mobility management based on mobility events associated with one or more of WTRUs 102a, 102b, and 102c.

RAN 105 may be connected to the core network 109. A communication link between RAN 105 and core network 109 may defined as an R3 reference point that may include one or more protocols for, e.g., facilitating data transfer and/or mobility management capabilities. Core network 109 may include one or more of mobile IP home agent (MIP-HA) 184, authentication, authorization, accounting (AAA) server 186, and gateway 188. While each of such elements are depicted as part of core network 109 in FIG. 1E, it is contemplated that any one or more of these elements may be owned and/or operated by an entity other than the core network operator.

MIP-HA 184 may be responsible for IP address management and may enable WTRUs 102a, 102b, and/or 102c to roam between different ASNs and/or different core networks. MIP-HA 184 may provide WTRUs 102a, 102b, and/or 102c with access to packet-switched networks, such as Internet 110, to facilitate communications between WTRUs 102a, 102b, and/or 102c and IP-enabled devices. AAA server 186 may be responsible for user authentication and/or for supporting user services. Gateway 188 may facilitate interworking with other networks. For example, gateway 188 may provide WTRUs 102a, 102b, and/or 102c with access to circuit-switched networks, such as PSTN 108, to facilitate communications between WTRUs 102a, 102b, and/or 102c and traditional land-line communications devices. Gateway 188 may provide WTRUs 102a, 102b, and/or 102c with access to other networks 112, which may include other wired and/or wireless networks that may be owned and/or operated by other service providers.

It is contemplated that RAN 105 may be connected to other ASNs and/or core network 109 may be connected to other core networks. A communication link between RAN 105 and one or more other ASNs may be defined as an R4 reference point that may include protocols for coordinating the mobility of WTRUs 102a, 102b, and/or 102c between RAN 105 and such other ASNs. A communication link between core network 109 and one or more other core networks may be defined as an R5 reference, which may include protocols for facilitating interworking between one or more home core networks and one or more visited core networks.

In LTE examples, multiple downlink reference signals (RSs) may be transmitted for one or more purposes. A WTRU may receive cell-specific reference signals (CRSs) from a PCell and/or an SCell. Such CRSs may be transmitted in downlink subframes in frequency division duplexing (FDD) examples. Alternatively, or in addition, such CRSs may be transmitted in downlink subframes and/or downlink pilot timeslots (DwPTSs) in time-division duplexing (TDD) examples. One or more CRSs may also, or instead, be transmitted in one or more resource blocks in the frequency domain.

In LTE, as many as eight resource elements (REs) per antenna port per physical resource block (PRB) may be used for the transmission of one or more CRSs. Note that in other examples, fewer, or more, REs per antenna port per PRB may be used for the transmission of one or more CRSs.

A CRS may assist one or more WTRUs in performing channel estimation for coherent demodulation of one or more downlink physical channels. In an example, one or more WTRUs may not use a CRS for demodulation of some downlink channels, such as a physical multicast channel (PMCH), a physical downlink shared channel (PDSCH), and/or an enhanced physical downlink shared channel (EPDCCH). A CRS may be used to acquire channel state information (CSI) for one or more transmission modes (TMs), e.g., transmission modes 1-8. A CRS may be used for higher-layer measurements, such as a basis for cell-selection and/or as a basis for handover decisions.

A WTRU-specific reference signal associated with a PDSCH may be referred to as a demodulation reference signal (DM-RS). A DM-RS that may be transmitted using one or more of the same resources that may be used for an associated PDSCH may be used to enable channel estimation for coherent demodulation of such a PDSCH (e.g., for transmission modes 7-10) and/or for demodulation of one or more other PDSCHs. A DM-RS that may be associated with a PDSCH based on one or more of any type of configuration, indication, and/or rule (e.g., rather than associated with a PDSCH based on use of one or more of the same resources) may be used with a PDSCH specified in such a configuration, indication, and/or rule.

A DM-RS may also, or instead, be used to enable demodulation of an EPDCCH channel. A DM-RS may be transmitted on one or more antenna ports, each of which may be associated with a number of layers used for transmission of a PDSCH and/or an EPDCCH. A DM-RS may be transmitted on one or more physical resource blocks. In an example, one or more DM-RSs may be transmitted on one or more physical resource blocks where a corresponding PDSCH and/or EPDCCH may be mapped. In an example, one or more DM-RSs may be mapped to a number of REs per PRB, such as twelve REs per PRB. Alternatively, or in addition, one or more DM-RSs may use an orthogonal cover code (OCC) to enable up to a number of ports, such as eight ports, that may be transmitted on a number of REs per PRB, such as 24 REs per PRB.

A CSI reference signal (CSI-RS) resource may be used to enable one or more WTRUs in one or more TMs, such as WTRUs in TMs 9-10, in acquiring CSI. A CSI-RS resource may have a lower time and/or frequency density than a CRS. For example, a periodicity of a CSI-RS resource may be, e.g., 80 subframes, where two REs per antenna port per PRB may be used for CSI-RS resource.

A WTRU in a TM, such as a WTRU in TM 10, may be configured with a channel-state information—interference measurement (CSI-IM). A CSI-IM configuration may indicate to a WTRU resources on which the WTRU may expect a zero-power transmission from a serving cell. Such CSI-IM resources may be used by a WTRU to make measurements based on, e.g., an assumption that measured signals may be interference plus noise.

A WTRU may be configured to make CSI measurements on CRS and/or CSI-RS, in some examples depending on a transmission mode (TM). Such measurements may include one or more of a rank indication (RI), a Channel Quality Indication (CQI), a Precoder Matrix Indication (PMI), and a Precoding Type Indicator (PTI). A WTRU may report such CSI measurements either in one or more physical uplink control channel (PUCCH) resources (e.g., for periodic CSI reports) and/or in one or more physical uplink shared channel (PUSCH) resources (e.g., for UCI on PUSCH or for aperiodic CSI reports).

Either or both of periodic and aperiodic CSI reports may be configured using one or more of multiple reporting modes. Such modes may indicate whether wideband CQI, WTRU-selected subband CQI, and/or (e.g., in aperiodic reporting examples) higher-layer-configured subband CQI feedback reports may be used. Reporting modes may indicate whether no PMI, a single PMI, or (e.g., in aperiodic reporting examples) multiple PMI feedback reports may be used.

For CQI calculations, a WTRU may determine an interference level. A method by which a WTRU determines an interference level may be dependent on an implementation. For example, a WTRU may determine an interference level as noise on a cell-specific reference signal. A WTRU may average an interference level over multiple subframes. A CSI-IM may be used as a resource that a WTRU may use to measure an interference level.

A WTRU may be configured with multiple CSI processes, e.g., to support coordinated multipoint (CoMP). A CSI process may include a combination of a CSI-RS and a CSI-IM. A WTRU may be configured to report separate CSI for each CSI process, in some examples periodically and/or aperiodically.

A WTRU may be configured to perform cell selection and/or to enable handovers. Such a WTRU may be configured in radio resource control (RRC) with measurement reporting of measurements such as, e.g., Reference Signal Received Power (RSRP), Reference Signal Strength Indicator (RSSI), and/or Reference Signal Received Quality (RSRQ). A WTRU may report such measurements in RRC measurement reports. A WTRU may be configured to, for example, constantly measure a plurality of cells. Based on whether a measurement fulfills a configurable condition, a WTRU may be triggered to report such measurements.

In an example, new radio (NR) access may be used, for example, in a fifth incarnation of mobile communications, such as 5G. NR may be used herein to refer to a 5G radio access protocol. The diverse use cases contemplated for NR may contribute to determining for the capabilities and/or requirements for systems implementing NR access. A contemplated approach for a design of a system, such as a 5G system, may correspond at least in part to NR access technology that may meet 5G requirements without limiting the applicability of the disclosed examples to such systems.

An air interface may enable one or more of improved broadband performance (e.g., IBB), industrial control and communications (e.g., ICC), vehicular applications (e.g., V2X), and massive machine-type communications e.g., (mMTC). For example, NR may be designed to handle and/or multiplex IBB, ICC, V2X, and/or mMTC communications.

Support for baseband filtering of a frequency-domain waveform may be provided. Baseband filtering of a frequency-domain waveform may enable aggregation of at least 150-200 MHz of total spectrum within an RF transceiver path.

Aggregation of spectrum across relatively widely separated operating bands (e.g., 900 MHz, 3.5 GHz) may use multiple RF transceiver chains, in some examples due to antenna size requirements and/or amplifier optimization design constraints. For example, a WTRU implementation may include, e.g., three separate RF transceiver paths, such as a first path below 1 GHz, a second path for a 1.8-3.5 GHz frequency range, and a third path for a 4-6 GHz frequency range.

Native built-in support for massive MIMO antenna configurations may be a second order requirement.

IBB examples may use multiple frequency bands that may each have spectrum of varying sizes. Such bands may be aggregated to achieve data rates in the order of, for example, several tens of Mbps (e.g., at a cell edge) up to peak data rates of several Gbps (e.g., up to 8 Gbps) with typical rates that may be on the order of several hundreds of Mbps.

Ultra-low transmission latency may be supported by, for example, air interface latency as low as 1ms round trip time (RTT) that may be achieved by supporting one or more transmission time intervals (TTIs) between, e.g., 100 µs and 250 µs. Support for ultra-low access latency (e.g., a time from initial system access until a completion of a transmission of a first user plane data unit) may also, or instead, be supported by implementations that use, e.g., ICC and/or V2X, and/or that may specify end-to-end (e2e) latency of, e.g., less than 10 ms.

Ultra-reliable transmissions may be supported by, for example, providing transmission reliability that may be lower than what may be found in legacy LTE systems. Support for mobility having a speed in a range of 0-500 km/h may be achieved in an example. Implementations that use, e.g., ICC and/or V2X, may specify a packet loss rate of less than $10e^{-6}$.

Support for machine-type communications (MTC) operation (such as, e.g., narrowband operation) may be provided. An air interface may support narrowband operation (e.g., using less than 200 KHz), extended battery life (e.g., up to 15 years of autonomy), and/or minimal communication overhead for small and/or infrequent data transmissions (e.g., low data rates in the range of 1-100 kbps with access latency of seconds to hours). Support for massive MTC (mMTC) examples may be provided by a narrowband operation implementation. An associated link budget may be comparable to a link budget of LTE extended coverage while a very large number of MTC devices (e.g., up to 200 k/km2) may be supported.

A system design may enable flexible spectrum usage, deployment strategies, and/or operation. One or more operations may use spectrum of varying sizes and/or that may include aggregation of non-adjacent carriers in a same and/or different frequency band(s) (e.g., licensed and/or unlicensed frequency bands). Narrowband and/or wideband operation, different duplexing methods (e.g., in a TDD example, dynamically variable downlink (DL)/uplink (UL) allocation), variable TTIs lengths, scheduled and/or unscheduled transmissions, synchronous and/or asynchronous transmissions, separation of a user plane from a control plane, and/or multi-node connectivity may be supported.

A system may integrate with one or more legacy Universal Terrestrial Access Networks (UTRANs), Evolved Universal Terrestrial Access Networks (EUTRANs), evolved packet core (EPC)/core networks (CN), and/or associated aspects. A system may integrate and/or operate with one or more legacy interfaces and/or evolution interfaces associated therewith. A system may be in communication with a legacy CN (e.g., by using an S1 interface, non-access stratum, etc.) and/or one or more legacy eNodeBs (e.g., by using an X2 interface that may include dual connectivity with a LTE entity). Such an exemplary system may enable legacy aspects, such as support for existing QoS and/or security mechanisms.

Elements of the disclosed examples may be included in LTE Evolution examples to provide, e.g., backward compatibility of some or all components. For example, TTIs shorter than an LTE slot (e.g., 0.5 ms) may use a different waveform than that used in LTE Evolution systems to enable ultra-low latency. For example, a physical layer (DL and/or UL) may be operated, e.g., in TDM and/or in FDM with LTE. Functionality that may be supported by legacy systems may be provided by enabling support for device-to device (D2D) functionality and/or sidelink functionality, license assisted access (LAA) operation using listen-before-talk (LBT), and/or relaying.

OFDM may be used as a basic signal format for data transmissions in LTE and/or IEEE 802.11. OFDM may divide spectrum into multiple parallel orthogonal subbands. Each subcarrier may be shaped using a rectangular window in the time domain, which may lead to sin c-shaped subcarriers in the frequency domain. OFDMA examples may have perfect frequency synchronization and tight management of uplink timing alignment within a duration of a cyclic prefix, e.g., to maintain orthogonality between signals and/or to minimize intercarrier interference. Such synchronization may not be used in a system where a WTRU may be connected to multiple access points simultaneously. Power reduction may be applied to uplink transmissions to comply with spectral emission requirements of adjacent bands, e.g., in the presence of aggregation of fragmented spectrum for a WTRU's transmissions.

Aspects of conventional OFDM (e.g., cyclic prefix (CP) OFDM (CP-OFDM)) may be addressed by more stringent RF requirements. Such examples may be used when operating using large amount of contiguous spectrum that may not require aggregation. A CP-based OFDM transmission scheme may lead to a downlink physical layer similar to that of a legacy system, for example, where modifications to pilot signal density and location are implemented.

Other waveform candidates may be used while conventional OFDM may be considered a candidate for a downlink transmission scheme.

A downlink transmission scheme may be based on a multicarrier waveform that may be characterized by high spectral containment (e.g., lower side lobes and/or lower out-of-band (OOB) emissions). Multicarrier (MC) waveform candidates may include orthogonal frequency division multiplex/offset quadrature amplitude modulation (OFDM/OQAM) and universal filtered multicarrier (UFMC) (e.g., universal filtered OFDM (UF-OFDM)). Multicarrier modulation waveforms may divide a channel into one or more subchannels and may modulate data symbols on subcarriers in such subchannels.

In OFDM-OQAM examples, a filter may be applied in a time domain per subcarrier to an OFDM signal to reduce OOB emissions. Use of OFDM-OQAM in an example may result in very low interference for adjacent bands, may not use large guard bands, and may not use a cyclic prefix. OFDM-OQAM examples may be sensitive to multipath effects and/or to high delay spread in terms of orthogonality, which may complicate equalization and/or channel estimation.

In UFMC (UF-OFDM) examples, a filter may be applied in the time domain to an OFDM signal to reduce OOB emissions. Filtering may be applied per subband to use spectrum fragments. OOB emissions in unused spectrum fragment(s) in a band may remain as high as OOB emissions in conventional OFDM. For example, UF-OFDM may improve over OFDM at edges of a filtered spectrum, but may not improve in a spectral hole.

Multiplexing in frequency of signals with non-orthogonal characteristics (such as different subcarrier spacing) may be implemented. In addition, or alternatively, co-existence of asynchronous signals may be used. Such examples may not require complex interference cancellation receivers. An aggregation of fragmented pieces of spectrum in baseband processing may be an alternative to systems that aggregate fragmented pieces of spectrum as part of RF processing.

Coexistence of different waveforms within a same band may be used, e.g., to support mMTC narrowband operation (e.g., using single carrier multiple access (SCMA)). A same band may support a combination of different waveforms, e.g., CP-OFDM, OFDM-OQAM, and/or UF-OFDM, for any or all disclosed aspects and/or for one or both of downlink and uplink transmissions. Such waveform co-existence may be used with transmissions that may use different types of waveforms between different WTRUs and/or transmissions that may use different types of waveforms from a same WTRU, e.g., either simultaneously, with some overlap, and/or consecutive in the time domain.

Hybrid types of waveforms may be supported, such as waveforms and/or transmissions that may support at least one of a possibly varying cyclic prefix (CP) duration (e.g., from one transmission to another), a combination of a CP and a low power tail (e.g., a zero tail), a form of hybrid guard interval (e.g., using a low power CP and an adaptive low power tail), or the like, and any combination thereof. Such hybrid types of waveforms may support dynamic variation and/or control of further aspects, such as the application of filtering. For example, hybrid types of waveforms may assist in determining whether filtering may be applied at an edge of a spectrum that may be used for reception of a transmission(s) for a given carrier frequency, at the edge of a spectrum used for reception of a transmission associated with a specific spectrum operation mode (SOM), per subband, and/or per group thereof. An uplink transmission scheme may use a same or a different waveform as that used for downlink transmissions. Multiplexing of transmissions to and/or from various WTRUs in a same cell may be based on FDMA and/or TDMA.

Spectrum flexibility may allow deployment in different frequency bands with different characteristics that may include different duplex arrangements and/or different and/or variable sizes of available spectrum, which may include contiguous and/or non-contiguous spectrum allocations in a same and/or different bands. Variable timing aspects may be supported. Support for multiple TTI lengths and/or support for asynchronous transmissions may be provided.

TDD and/or FDD duplexing schemes may be supported. In FDD operation, supplemental downlink operation may be supported using spectrum aggregation. FDD operation may support either or both full-duplex FDD and half-duplex FDD operation. For TDD operation, a DL/UL allocation may be dynamic. For example, a DL/UL allocation may not be based on a fixed DL/UL frame configuration. A length of a DL and/or a UL transmission interval may be set per transmission opportunity.

Transmission bandwidths on an uplink and a downlink may differ from one another. For example, a bandwidth of each of an uplink and a downlink may independently range from a nominal system bandwidth to a maximum value corresponding to a system bandwidth.

In single carrier operation, system bandwidths may include 5, 10, 20, 40, and/or 80 MHz. System bandwidths may be any bandwidth in any given range, e.g., from a few MHz to 160 MHz (or more). A nominal bandwidth may have one or more fixed values. Narrowband transmissions of up to a specified frequency, such as 200 KHz, may be supported within the operating bandwidth for MTC devices.

Figure 2:
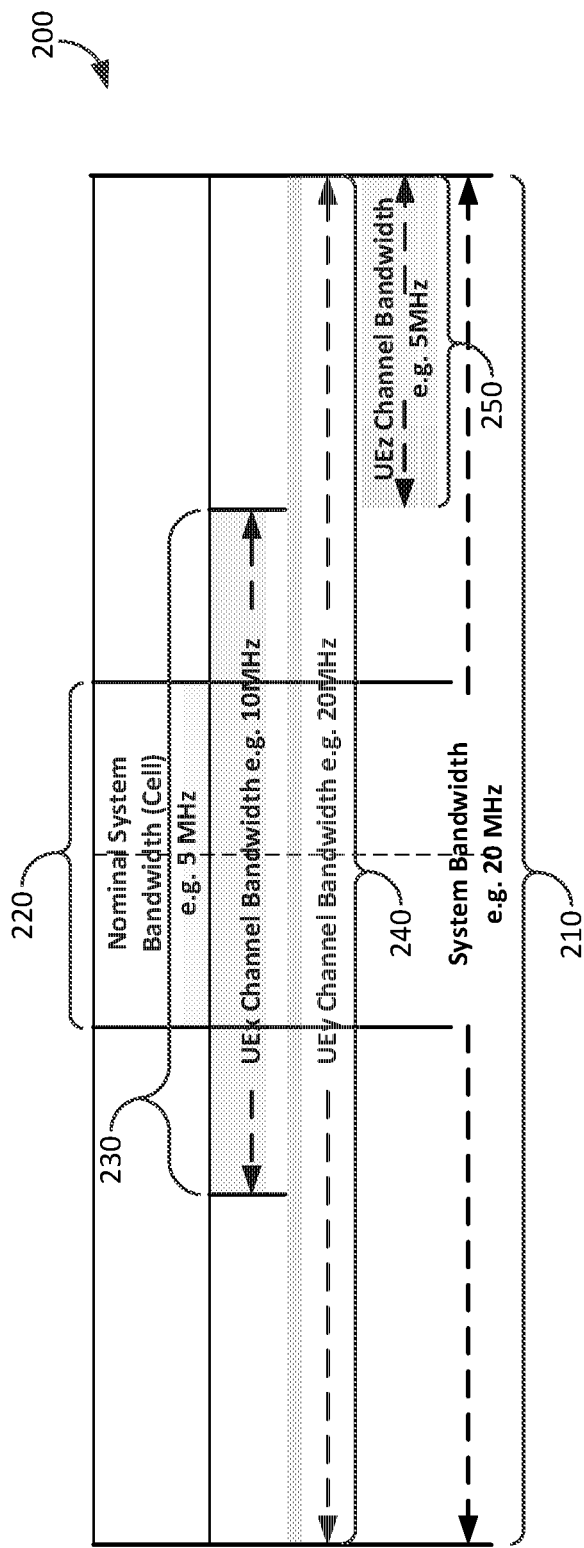
FIG. 2 is a graph illustrating exemplary channel bandwidths.

FIG. 2 illustrated exemplary transmission bandwidths 200. "System bandwidth" as used herein may refer to a largest portion of spectrum that may be managed by a network for a given carrier, such as system bandwidth 210 of FIG. 2. For such a carrier, a portion that a WTRU may minimally support for cell acquisition, measurements, and/or initial access to a network may correspond to a nominal system bandwidth, such as nominal system bandwidth 220 of FIG. 2. A WTRU may be configured with a channel bandwidth that may be within a range of an entire system bandwidth. For example, WTRUx as shown in FIG. 2 may be configured with channel bandwidth 230 that may be a bandwidth of 10 MHz that includes nominal system bandwidth 220. In another example, WTRUy as shown in FIG. 2 may be configured with channel bandwidth 240 that may all of system bandwidth 210, including nominal system bandwidth 220. Some or all of the channel bandwidth utilized by the WTRU may support NR access.

While each of channel bandwidth 230 and 240 include nominal system bandwidth 220, a WTRU's configured channel bandwidth may or may not include a nominal part of a system bandwidth, as shown in exemplary transmission bandwidths 200 of FIG. 2. For example, while bandwidths 230 and 240 include nominal system bandwidth 220, WTRUz as shown in FIG. 2 may be configured with channel bandwidth 250 that may not include nominal system bandwidth 220.

One or more sets of RF requirements for a maximum operating bandwidth in a band may be met without the introduction of additional allowed channel bandwidths for that operating band, which may allow for bandwidth flexibility. Baseband filtering of a frequency domain waveform may be supported. A physical layer may be band-agnostic and/or may support operation in licensed bands below, e.g., 5 GHz and/or operation in unlicensed bands in the range of, e.g., 5-6 GHz. An LBT Cat 4 based channel access framework, which may be similar to LTE LAA, may be supported, for example, in operation in unlicensed bands.

Downlink control channels and/or signals may support FDM operation. A WTRU may acquire a downlink carrier by receiving transmissions using a nominal part of a system bandwidth, for example, where a WTRU may not initially receive transmissions covering an entire bandwidth that may be managed by a network for an associated carrier.

Downlink data channels may be allocated over a bandwidth that may or may not correspond to a nominal system bandwidth. For example, a bandwidth over which downlink data channels may be allocated may be determined without restrictions other than being within a WTRU's configured channel bandwidth. In an illustrative, non-limiting example, a network may operate a carrier with a 12 MHz system bandwidth using a 5 MHz nominal bandwidth that may allow devices supporting, e.g., at most 5 MHz maximum RF bandwidth to acquire and/or access the system while allocating +10 to −10 MHz of the carrier frequency to other WTRU's that may be supporting up to 20 MHz worth of channel bandwidth.

Figure 3:
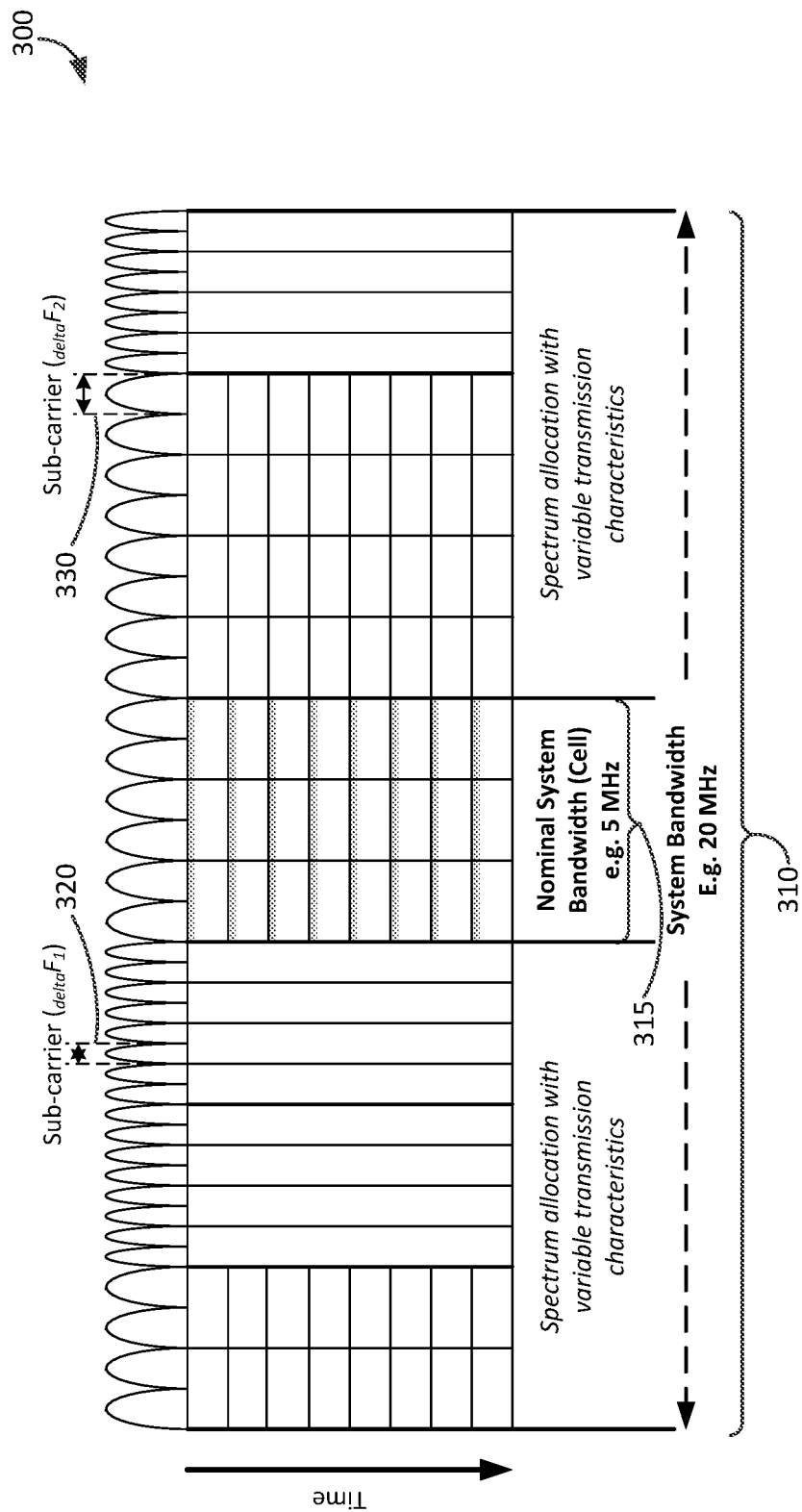
FIG. 3 is a graph illustrating an exemplary spectrum allocation.

FIG. 3 shows chart 300 illustrating an exemplary spectrum allocation that includes system bandwidth 310 and nominal system bandwidth 315. Different subcarriers may be assigned to different modes of operation. Such modes of operation may be referred to as "spectrum operation modes" or "SOMs." FIG. 3 illustrates exemplary subcarriers 320 and 330. Subcarrier 320 may be assigned to a SOM that differs from a SOM associated with subcarrier 330.

Different SOMs may be used to fulfill different requirements for different transmissions. A SOM may comprise and/or be characterized by and/or be defined by and/or be associated with one or more of a subcarrier spacing, a symbol length, a TTI length, and a reliability aspect (such as a hybrid automatic repeat request (HARQ) processing aspect). A SOM may also, or instead, comprise and/or be characterized by and/or be defined by and/or associated with one or more of a specific secondary control channel, a specific waveform, any physical layer aspect. For example, an LTE signal may correspond to a first SOM. A first type of NR transmission may correspond to a second SOM. In an example, NR may support transmissions from multiple SOMs, for example a first SOM for NR supporting a massive broadband-type use case, a second SOM for NR supporting an ultra-reliable low-latency communication (URLLC) type use case, a third SOM for NR supporting a mMTC-type use case, etc. A SOM may be used to refer to a specific waveform and/or may be related to a processing aspect, such as an aspect that may support co-existence of different waveforms in a same carrier using FDM and/or TDM. Similarly, a SOM may be used where coexistence of FDD operation in a TDD band may be supported, e.g., in a TDM manner or similar implementations. As shown in FIG. 3, portions of a carrier/spectrum may be associated with variable transmission characteristics, for example to support transmissions associated with different SOMs at different points in time.

In single carrier operation, spectrum aggregation may be supported. A WTRU may support transmission and/or reception of multiple transport blocks over contiguous and/or non-contiguous sets of physical resource blocks (PRBs) within a same operating band. Single transport blocks may be mapped to separate sets of PRBs. Simultaneous transmissions associated with different SOM requirements may be supported.

Multicarrier operation may be supported. A contiguous and/or a non-contiguous spectrum block may be used within a same operating band and/or across two or more operating bands. Spectrum blocks using different modes (e.g., FDD and TDD) and/or using different channel access methods (e.g., licensed and unlicensed band operation) may be aggregated. A WTRU's multicarrier aggregation may be configured, reconfigured, and/or dynamically changed. Due to efficient baseband filtering in the frequency domain, in some examples RF specification work to support additional channels and/or band combinations may not be used.

Downlink and uplink transmissions may be organized into radio frames that may be characterized by one or more fixed aspects (e.g., a location of downlink control information) and one or more varying aspects (e.g., transmission timing, supported types of transmissions). A basic time interval (BTI) may be expressed in terms of an integer number of one or more symbol(s). Symbol duration may be a function of subcarrier spacing applicable to a time-frequency resource. In FDD systems, subcarrier spacing may differ between an uplink carrier frequency $f_{UL}$ and a downlink carrier frequency $f_{DL}$ for a given frame.

A transmission time interval (TTI) may be a minimum time between consecutive transmissions that may be supported by a system. Each consecutive transmission may be associated with a different transport block (TB) for a downlink ($TTI_{DL}$) and for an uplink transceiver (UL TRx) and may exclude a preamble. Each consecutive transmission may include control information (e.g., downlink control information (DCI) for downlink, uplink control information (UCI) for uplink). A TTI may be expressed in terms of an integer number of one or more BTI(s). A BTI may be specific and/or associated with a SOM. Frame durations may include, but are not limited to, 100 µs, 125 µs (⅛ ms), 142.85 µs (e.g., ¹⁄₇ ms may be two nCP LTE OFDM symbols), and/or 1 ms. One or more frame durations may be selected to enable alignment with a legacy LTE timing structure.

A frame may start with DCI that may have a fixed time duration $t_{dci}$, that may precede a downlink data transmission (DL TRx) for an associated carrier frequency, for example $f_{UL+DL}$ for TDD and $f_{DL}$ for FDD.

Figure 4:
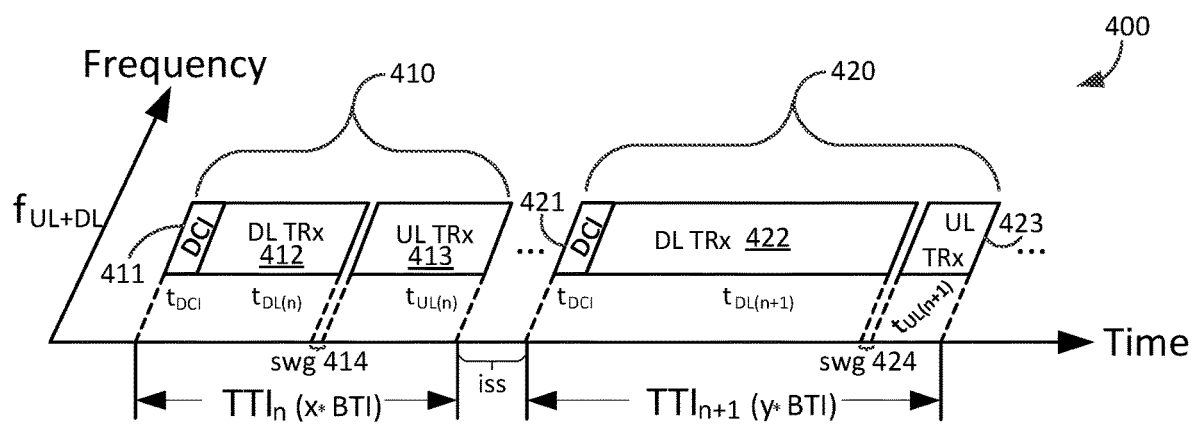
FIG. 4 is a diagram of an exemplary frame structure.

Frame structure 400 of FIG. 4 illustrates an exemplary frame structure that may be used in TDD duplexing examples. TDD duplexing examples may use a frame that may consist of both a downlink portion (DCI and DL TRx) and an uplink portion (UL TRx), such as frame 410 that may include DCI 411, DL TRx 412, and UL TRx 413. Also illustrated in FIG. 4 is frame 420 that may include DCI 421, DL TRx 422, and UL TRx 423. TDD duplexing examples may also, or instead, use a frame that may consist of a downlink portion (DCI and DL TRx) but not an uplink portion (UL TRx). A switching gap (swg), such as swg 414 and swg 424, may precede an uplink portion of a frame, for example, for frames of a given configuration.

TDD examples may support D2D, V2X, and/or Sidelink operations in a frame by including a respective downlink control and/or forward direction transmission in the DCI+DL TRx portion of such a frame (e.g., if a semi-static allocation of the respective resources is used) or in the DL TRx portion of such a frame (e.g., for dynamic allocation). A respective reverse direction transmission may be included in a UL TRx portion.

Figure 5:
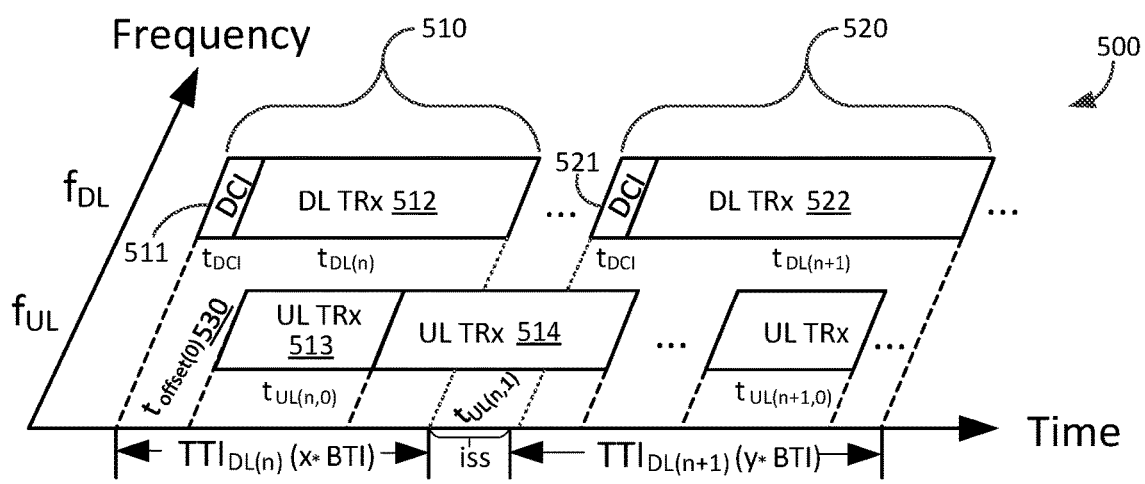
FIG. 5 is a diagram of another exemplary frame structure.

Frame structure 500 of FIG. 5 illustrates an exemplary frame structure that may be used in FDD duplexing examples and that may use a frame that may include a downlink reference TTI and/or one or more TTI(s) for an uplink. FDD duplexing examples may use a frame that may consist of both a downlink portion (DCI and DL TRx) and an uplink portion (UL TRx), such as frame 510 that may include DCI 511, DL TRx 512, and UL TRx 513. Also illustrated in FIG. 5 is frame 520 that may include DCI 521, DL TRx 522, and UL TRx 523. An uplink portion may overlap two frames, such as uplink portion 514 that overlaps frames 510 and 520.

A start of an uplink TTI may be derived using an offset (e.g., $t_{offset}$) such as $t_{offset}$ 530 shown in FIG. 5. An offset may be applied from a start of a downlink reference frame that may overlap the start of an uplink frame.

FDD examples may support D2D, V2X, and/or Sidelink operations in a UL TRx portion of a frame by including respective downlink control, forward direction, and/or reverse direction transmissions in a UL TRx portion of such a frame (e.g., dynamic allocation of one or more respective resources may be used).

A scheduling function may be supported in a Medium Access Control (MAC) layer. Two or more scheduling modes may be supported. A scheduling mode may be network-based scheduling that may be used for tight scheduling in terms of resources and timing and transmission parameters of downlink transmissions and/or uplink transmissions. Another scheduling mode may be WTRU-based scheduling that may provide for flexibility in terms of timing and/or transmission parameters. For either or both such modes, scheduling information may be valid for a single TTI or for multiple TTIs.

Network-based scheduling may be used, for example, to enable a network to manage available radio resources that may be assigned to various WTRUs. Such a scheduling scheme may be used to improve sharing of such resources. Dynamic scheduling may also, or instead, be supported.

WTRU-based scheduling may be used to assist a WTRU in opportunistically accessing uplink resources with minimal latency on a per-need basis, e.g., within a set of shared and/or dedicated uplink resources assigned (dynamically or otherwise) by a network. Synchronized and unsynchronized opportunistic transmissions are contemplated in the instant disclosure. Contention-based transmissions and contention-free transmissions are contemplated in the instant disclosure.

Support for opportunistic transmissions (scheduled or unscheduled) may be used to address ultra-low latency requirements that may be associated with some configurations and/or power saving requirements that may be associated with some configurations.

Association of data available for transmission and available resources for uplink transmissions may be supported. Multiplexing of data having different QoS requirements within a same transport block may be supported, for example, where such multiplexing may not introduce a negative impact to a service with stringent QoS requirements and/or may not introduce an unnecessary waste of system resources.

A transmission may be encoded using one or more encoding methods. Different encoding methods may have different characteristics. For example, an encoding method may generate a sequence of information units. Each information unit, which may otherwise be referred to as a "block", may be self-contained such that an error in the transmission of a first block may not impair the ability of a receiver to successfully decode a second block. For example, where a first block has an error, a second block may be error-free and/or may have sufficient redundancy such that the second block may be successfully decoded. The second block may be decoded by a receiver while the first block may not be decoded due to errors associated with the first block.

Encoding methods such as raptor/fountain codes may be used, where a transmission may consist of a sequence of N raptor codes. One or more such codes may be mapped to one or more transmission "symbols" in time. Such a symbol may correspond to one or more sets of information bits (e.g., one or more octets). Such encoding may be used to add forward error correction (FEC) to a transmission so that the transmission may use N+1 or N+2 raptor codes (or symbols, assuming a raptor code symbol relationship) so that the transmission may be more resilient to a loss of one "symbol," e.g., due to interference or puncturing by another transmission overlapping in time.

A WTRU may be configured to receive and/or detect one or more system signatures. A system signature may include a signal structure that may use a sequence. A signal including such a system signature may be similar to a synchronization signal (e.g., similar to an LTE primary synchronization signal (PSS) or secondary synchronization signal (SSS)). A system signature may be specific to (e.g., uniquely identify) a particular node and/or a transmission/reception point (TRP) within a given area. Alternatively, or in addition, a system signature may be common to a plurality of nodes and/or TRPs within an area. Whether a signature is specific to a node and/or a TRP may be information unknown and/or irrelevant to a WTRU. A network TRP supporting NR transmission and/or reception may be referred to as a gNB.

A WTRU may determine and/or detect a system signature sequence and may determine one or more parameters associated with the system. For example, a WTRU may derive an index from a system signature sequence and may use this index to retrieve associated parameters, for example, by using a table such as an access table as described herein. A WTRU may use a received power associated with a system signature for open-loop power control, e.g., for setting an initial transmission power if a WTRU determines that it may access and/or transmit using applicable resources of a system. A WTRU may use a timing of a received signature sequence for, e.g., setting a timing of a transmission (e.g., a preamble on a PRACH resource) if the WTRU determines that it may access and/or transmit using applicable resources of a system.

A WTRU may be configured with a list having one or more entries. Such a list may be referred to as an access table. An access table may be indexed such that each entry may be associated with a system signature and/or a sequence associated with a system signature. An access table may provide initial access parameters for one or more areas. Each access table entry may provide one or more parameters that may be used to perform an initial access to a system. Parameters included in an access table may include a set of one or more random access parameters that may include, for example, applicable physical layer resources such as one or more physical random access channel (PRACH) resources, in time and/or frequency, an initial power level, one or more physical layer resources that may be used for reception of a response, and/or the like in any combination.

Parameters associated with an access table entry may also, or instead, include access restrictions such as a public land mobile network (PLMN) identity and/or CSG information. Such parameters may also, or instead, include routing-related information such as one or more applicable routing areas. Each table entry may be associated with and/or indexed by a system signature. One entry may be common to a plurality of nodes and/or TRPs.

A WTRU may receive or obtain an access table by means of a transmission using dedicated resources such as resources associated with an RRC configuration and/or a transmission that may use broadcasted resources. Where broadcasted resources may be used, a periodicity of transmission of an access table may be relatively long (e.g., up to 10240 ms) such that it may be longer than a periodicity of transmission of a signature (e.g., in the range of 100 ms).

A reduction of transmissions, and thereby a reduction of use of bandwidth, may be desired. A reduction of signals in a system may reduce unnecessary interference for neighboring transmission points (TRPs), reduce reference signal overhead, and/or reduce power consumption at a transmission point.

A reduction of reference signal overhead may be beneficial for mobile broadband communications, e.g., in an environment where support of more than one transmission method may be provided (e.g., massive MIMO, CoMP). Reducing reference signal overhead (e.g., pilot contamination) and/or reducing inter-TRP interference may increase the coverage of higher order modulation transmissions and may be beneficial to WTRUs operating in such an environment. A reduction of inter-TRP interference may be beneficial for ultra-reliable communications.

WTRUs may perform measurements on one or more reference signals and may use such measurements for one or more of a variety of purposes, such as to measure received power, to measure channel quality, to enable derivation of CSI, to enable channel estimation for demodulation, etc. WTRUs may need to know when to expect a transmission of a reference signal. Various methods and systems that may be used to indicate a presence of one or more reference signals to a WTRU are set forth.

A reduction of transmission of signals may be achieved by reducing a periodicity of some such signals. In some modes of operation (e.g., ultra-reliable communications) it may not be desirable to introduce a lag between a measured CSI feedback and an actual transmission, as may be experienced with a reduction of the periodicity of some signals.

To limit transmission of one or more reference signals, a WTRU may perform multiple operations on one or more (e.g., one) reference signal types. A WTRU may be alerted to the purpose of a reference signal.

Note that an acronym for New Radio, "NR," may be used herein to identify a new radio interface that may differ from LTE interfaces. NR may also be used to indicate interfaces that are contemplated as being used in a future system. Systems and methods set forth herein may be applicable to either or both of a reception of one or more Reference Measurement Resources (RMRs) and transmission of one or more RMRs.

A WTRU may be configured with one or more RMRs. For a downlink, one or more RMRs may be used to perform measurements on at least one signal transmission (e.g., a transmitted signal RMR, if present, may be used to perform measurements on at least one signal) and/or to perform measurements on resources where at least one signal may not be expected (e.g., a blanked RMR, if present, may be used to perform measurements on one more resources where at least one signal may not be expected).

For an uplink, one or more RMRs may be used to perform a transmission of at least one signal (e.g., a transmitted signal RMR, if present, may be used to perform a transmission of at least one signal). Alternatively, or in addition, no transmission may be performed (e.g., based on a blanked RMR, if present). Note that examples set forth herein referring to a reception of RMR (e.g., DL RMR or SL RMR) by a WTRU may also be applicable to a transmission of RMR (e.g., UL RMR or SL RMR), for example, by a WTRU.

A WTRU may detect a presence of one or more resources on which the WTRU may perform one or more measurements. Such resources may be RMRs. An RMR may be a non-zero power reference signal on which at least one TRP may transmit a signal. An RMR may also, or instead, be a zero power reference signal on which at least one TRP may not transmit a signal (e.g., one or more TRPs may not transmit a signal on unused resources). A non-zero power reference signal RMR may be referred to as a "transmitted signal RMR." A zero power reference signal RMR may be referred to as a "blanked RMR."

As used herein, "transmission of an RMR" may refer to either or both of a transmitted signal RMR and a blanked RMR. Further as used herein, "transmission of an RMR" should be understood as equivalent to "a presence of an RMR" (e.g., in a resource grid that may represent a set of applicable physical layer resources).

A transmitted RMR may be an RMR that may be transmitted by a WTRU in a UL, whereas a blanked RMR may be a set of resources on which a WTRU may not transmit anything. For example, a blanked RMR may indicate to a WTRU a pattern of resources around which the WTRU may rate-match and/or puncture any UL transmission.

Note that the examples set forth herein may be described in a context of reference measurement resources that may be transmitted by one or more TRPs, it is contemplated that the disclosed examples may also be applicable to WTRUs that may be transmitting one or more RMRs, for example, when operating in a device-to-device communication mode.

RMRs may be characterized by one or more parameters. One or more RMRs may be configured on a WTRU. Such a WTRU may expect that at least one TRP may transmit a signal. Such a WTRU may use specific parameters that may enable the WTRU to use advanced detection to make required measurements. For example, RMRs may be defined by (and/or configured with) at least one of various parameters.

Parameters associated with an RMR may include, but are not limited to, a resource element mapping. A resource element mapping may map an RMR to a set of resource elements in one or more symbols and/or to one or more subcarrier. In an example, an RMR may be a concatenation of multiple resource elements.

Parameters associated with an RMR may include, but are not limited to, a sequence that, in some examples, may be predetermined. For example, the signal transmitted on an RMR by at least one TRP may be a pre-determined sequence. A sequence may be generated using, for example, a pseudo-random sequence. A sequence may be generated using one or more other parameters of the RMR.

Parameters associated with an RMR may include, but are not limited to, a unique word, such as a unique word OFDM (UW-OFDM), that may be used to transmit an RMR. A guard period may be used in one or more frame structures (e.g., in self-contained subframes where DL and UL portions may be separated by a guard period). Such a guard period may be used to transmit an RMR.

Parameters associated with an RMR may include, but are not limited to, a signal structure. An RMR may have a different signal structure than that of one or more concurrent transmissions. For example, an RMR may use a first subcarrier spacing while one or more concurrent non-RMR transmissions may use a second subcarrier spacing. An RMR may also, or instead, assume a first TTI duration or subframe duration while one or more concurrent non-RMR transmissions may use a second TTI duration or subframe duration.

Parameters associated with an RMR may include, but are not limited to, a transmission power. A transmission power of an RMR may be fixed or may be variable over different realizations of a same RMR. An RMR transmission power may be associated with a concurrent transmission of another channel.

Parameters associated with an RMR may include, but are not limited to, an analog beam. Multiple RMRs may be multiplexed in a same, or overlapping, resources using different beams.

Parameters associated with an RMR may include, but are not limited to, a precoding. A precoding used to transmit an RMR over multiple antenna ports may be fixed or may be variable. An RMR precoding may be tied to a concurrent transmission of another channel.

Parameters associated with an RMR may include, but are not limited to, a set of antenna ports. A set of antenna ports may be used for transmissions from one or more TRPs.

Parameters associated with an RMR may include, but are not limited to, a cover code. Multiple RMRs may be multiplexed in a same, or overlapping, resources using orthogonal cover codes.

Parameters associated with an RMR may include, but are not limited to, a timing aspect. An RMR may be associated with a periodicity in terms of time, such as in terms of symbols within a subframe, in terms of subframe (e.g., one or more symbols), and/or in terms of radio frames (e.g., a plurality of subframes).

Note that any of the parameters associated with an RMR set forth herein may be associated with one or more of downlink transmissions, uplink transmissions, and/or sidelink transmissions.

RMRs configured on a WTRU that may be expecting one or more TRPs to not be transmitting may use the same and/or similar parameters as those set forth herein for RMRs configured on a WTRU that may be expecting one or more TRPs to transmit a signal.

One or more blanked RMRs may be assumed by a WTRU to be composed of interference and noise. In such examples, a WTRU may perform energy detection.

One or more blanked RMRs may be used by a WTRU to measure specific types of interference. A WTRU may be configured with a blanked RMR by an NR network node to enable the WTRU to measure interference from other RATs (e.g., LTE, Wi-Fi, etc.). Such a WTRU may be configured with parameters that may be associated with inter-RAT interference. Targeted interference measurement may be kept distinct from one or more measurements performed by a WTRU for energy detection.

One or more blanked RMRs may be used by a WTRU to measure one or more signals transmitted by one or more other RATs. A WTRU may be configured with at least one blanked RMR that may coincide with a transmission of LTE CSI-RS (or any other type of LTE RS) from an LTE cell that may be co-located with a TRP (e.g., an NR TRP) with which the WTRU communicates. A WTRU may also, or instead, be configured with a blanked RMR that may coincide with a transmission of LTE CSI-RS from an LTE cell that is not co-located with a TRP with which the WTRU communicates. A WTRU may be configured with at least one blanked RMR that may enable inter-RAT mobility measurements.

A WTRU may be configured to perform one or more measurements. Such measurements may be performed on one or more RMRs. Each of such one or more measurements may be associated with a purpose that may correspond to a specific procedure.

A measurement may be associated with one or more WTRU procedures, including, but not limited to, procedures for selection of a cell, signature, TRP, TRP group (TRPG), and Sidelink WTRU. A measurement may also, or instead be associated with one or more other WTRU procedures, including, but not limited to, mobility-related measurements (e.g., intra- or inter-cell/signature/TRPG or RAT), radio link monitoring (RLM) related logic, Radio Link Failure (RLF) related logic, a demodulation process, or the like.

A purpose for a measurement may correspond to a SOM. For example, a measurement may be associated with a specific service, transport channel (TrCH), and/or an operation of a physical channel (or type thereof).

A measurement may, for example, be used locally by a WTRU and/or may be used to provide feedback that may be reported by a WTRU to at least one TRP. A WTRU may be configured, dynamically or semi-statically, to perform specific measurements on one or more RMRs. A WTRU may autonomously determine a measurement to be taken on one or more RMRs.

Any one or more measurements may be performed for any one or more of several purposes. A measurement may be used to identify a TRP. Where one or more RMRs may be used by a WTRU to determine a presence of one or more TRPs, a measurement of such one or more RMRs may be used to identify one or more TRPs. An RMR may implicitly (e.g., via a parameter) or explicitly indicate a TRP identifier. As used herein, a TRP may refer to a node and/or a transmission setting. An exemplary transmission setting may include a specific beam used by a TRP.

A measurement may be used to identify another WTRU. An RMR may be used by a first WTRU to determine a presence of a second WTRU or a set of other WTRUs. Alternatively, or in addition, an RMR may be used by a first WTRU to identify a second WTRU or a set of other WTRUs. A second WTRU may be configured to transmit during an RMR configured for a first WTRU. The second WTRU may transmit a signal that may explicitly or implicitly provide an identity to the first WTRU.

A measurement may be used for synchronization. A WTRU may use an RMR to synchronize with one or more TRPs and/or with another one or more WTRUs. An RMR may be used for coarse and/or fine time synchronization. Additionally, or instead, an RMR may be used for coarse and/or fine frequency synchronization.

A measurement may be used to perform one or more mobility measurements. Mobility measurements, which may also be referred to as higher layer measurements, may include one or more of RMR received power (e.g., power measured on one or more RMRs), RMR received quality (e.g., power measured on one or more RMRs divided by a signal strength indicator), and RMR signal strength indication (e.g., power measured over one or more symbols).

A measurement may be used to determine path loss estimation (or a similar measurement) for one or more TRPs and/or another one or more WTRUs. Such a measurement may be used in combination with one or more other parameters. An RMR may have a fixed transmission power or a configurable transmission power, either of which may be known at, or indicated to, a WTRU. This WTRU may use a received power of the RMR in combination with the transmission power of the RMR to determine the path loss.

A measurement may be used to perform CSI measurements. A WTRU may use an RMR to obtain CSI measurements, which may include, but are not limited to, one or more of rank, preferred precoder matrix, channel quality, selected subbands, interference, main interferer identification, preferred beam, preferred channel, signal-to-interference-plus-noise ratio (SINR), channel outage, WTRU speed, coherence time, and coherence bandwidth.

A measurement may be used to perform radio link monitoring (RLM). A WTRU may use an RMR to perform RLM. A WTRU may determine whether the received signal strength may be above a threshold value. A threshold value may be associated with a required control channel block error rate (BLER) performance. Such a threshold value may be configurable. A threshold value may depend on a parameter of a WTRU's transmissions and/or receptions. For example, different traffic types (e.g., eMBB, Ultra-Reliable and Low-Latency Communications ("URLLC"), mMTC) may have different associated thresholds.

A measurement may be used to perform demodulation. A WTRU may use an RMR to perform channel estimation that may be used in demodulation.

A measurement may be used to perform quasi co-location (QCL). A WTRU may use an RMR to obtain fine frequency and/or timing estimation. QCL measurements may include one or more of a Doppler shift, a Doppler spread, an average delay, and a delay spread. QCL information obtained on a first RMR may be used with a second or other RMR.

A measurement may be used to perform clear channel assessment. A WTRU may use an RMR to perform one or more measurements that may be used to determine clear channel assessment, e.g., for an unlicensed channel.

A measurement may be used to perform signal structure identification. A WTRU may use an RMR to determine a preferred signal structure. Alternatively, or in addition, a WTRU may use an RMR to blindly determine a signal structure that may be in use. A WTRU may perform measurements assuming different signal structures and may use a correlation receiver to determine a signal structure in use.

A measurement may be used to perform a determination of channel occupancy. A WTRU may use an RMR to determine a number of devices that may be using a channel. For example, a WTRU may use an RMR to detect signal messages from other devices (e.g., other WTRUs) in order to determine channel occupancy. Alternatively, or in addition, a WTRU may use an RMR to measure a usage (e.g., a fraction of resources being used by other devices to transmit data) of a set of resources. Usage of a set of resources may be determined based on energy detection and/or control channel detection. A WTRU may be configured with different measurement thresholds that may be tied to different channel occupancy values. Channel occupancy may also, or instead, be determined as a function of how often a measurement is above or below a measurement threshold in a set of measurement occasions.

A measurement may be used to perform a determination of a type of channel usage based on a measurement of an RMR, a presence of an RMR, and/or a parameter of an RMR. A WTRU may have conditional access to a channel (e.g., a shared access channel) depending on a current channel usage type. The channel usage type may be an SOM, a transmission type (e.g., URLLC or mMTC), or a shared spectrum tier of users (e.g., incumbents, Priority Access License (PAL) tier, General Authorized Access (GAA) tier). A WTRU may be configured with a blanked RMR. Such a WTRU may determine a type of interference that may be present within one or more resources of such a blanked RMR, for example, to determine a type of channel usage. In an example, such a WTRU may also perform one or more other determinations based on such a determination of a type of interference.

A measurement may be used to perform speed and/or Doppler estimation. A WTRU may use one or more RMRs to estimate the WTRU's speed. A WTRU may also, or instead, use one or more RMRs to feed back measurements to a network for speed estimation purposes. Such measurements may be based on a relative timing of reception of one or more associated signals.

A measurement may be used to determine positioning. A WTRU may use one or more RMRs to determine the WTRU's position. A WTRU may also, or instead, use one or more RMRs to feed back measurements to a network for position determination purposes. One or more associated signals may be designed to enable positioning.

Any measurement purpose and measurement type, and any combination thereof, may be performed according to the instant disclosure. Any measurement purpose and measurement type, and any combination thereof, may be a configuration aspect according to the instant disclosure. All such measurement purposes and measurement types, and any combination thereof, are contemplated as within the scope of the instant disclosure.

A WTRU may "blindly" determine one or more RMR configurations. Such a determination may be based on a transmission and/or a transmission parameter of a signal and/or an RMR, either or both of which may not be associated with the RMR for which the WTRU may be determining a configuration. A WTRU may determine one or more RMR configurations based on a signal structure, a SOM, and/or a frame structure. A waveform in use may indicate one or more RMR configurations.

A WTRU may determine one or more RMR configurations as a function of a downlink signal that, for example, may not be associated with the one or more RMRs for which the WTRU may be attempting to determine a configuration. A WTRU may determine one or more RMR configurations as a function of one or more access parameters. For example, a WTRU may determine an RMR configuration using a TRP identity, a TRPG identity, a system signature, a cell identity, and/or a physical resource that may be applicable, e.g., to transmission of a preamble. A WTRU may determine one or more RMR configuration aspects as a function of a preamble transmission (e.g., selected preamble, PRACH resource, applicable subframe) and/or as a function of a Radio Network Temporary Identifier (RNTI) in order to, e.g., decode a response, such as a random access RNTI (RA-RNTI).

A WTRU may be configured for transmission and/or reception of one or more RMRs. Such a configuration may be dynamic, semi-static, or static. An RMR configuration may be indicated via a physical layer and/or one or more higher layers. Where a WTRU may be configured semi-statically with one or more RMR configurations, one or more of such configurations may be tied to a respective RMR ID. A semi-static configuration may be implemented via system information and/or higher layer signaling (e.g., RRC). RMRs may be dynamically activated and/or deactivated, in some examples using an indication of an RMR ID. An indication of an RMR ID may be communicated using PHY layer signaling (e.g., DCI or a control channel from another device).

"RMR," "RMR configuration," "RMR instantiation," "RMR activation," and "RMR deactivation" may be used interchangeably herein. Any aspect described herein as associated with any one or more of these terms is contemplated as being applicable to any other of these terms and any respective devices, systems, and methods.

An RMR, RMR configuration, and/or RMR instantiation may include an associated identifier, such as an RMR ID, that may identify a respective RMR, RMR configuration, and/or RMR instantiation.

An RMR, RMR configuration, and/or RMR instantiation may include an RMR resource mapping. Such a resource mapping may include one or more of a subcarrier and/or symbol locations. Such a resource mapping may also, or instead, include one or more of subframes that may be within a frame. Such a resource mapping may also, or instead, include one or more of a subframe offset, a TTI offset, each or both of which may be associated with a subframe periodicity or TTI periodicity. Such a resource mapping may also, or instead, include one or more indications of antenna ports that may be associated with, e.g., one or more beams on which an RMR may be received by a WTRU.

An RMR, RMR configuration, and/or RMR instantiation may include an RMR presence duration and/or indication thereof. Such a configuration may be associated with a single instance of an RMR (e.g., over one or multiple symbols that may be within one or more subframes). Such a configuration may also, or instead, be associated with multiple instances of an RMR. A WTRU may be configured with an RMR and may assume the presence of this RMR in one or more relevant symbols and/or subframes. In some examples, such a WTRU may be configured with a periodicity and may assume the presence of an RMR until the WTRU may be instructed by an associated TRP or other device to cease assuming the presence of the RMR. Alternatively, or instead, an RMR configuration may include a period for which the configuration is valid. Such a period may be measured in symbols, subframes, frames, time units, or any other units or measures.

An RMR, RMR configuration, and/or RMR instantiation may include an RMR frequency. An RMR configuration may be associated with a subband, a set of subcarriers, and/or a frequency block. A WTRU may be configured with an RMR applicable to a set of subbands and may subsequently be configured to remove (or deactivate) the RMR in specific subbands contained within that set of subbands.

An RMR, RMR configuration, and/or RMR instantiation may include an RMR measurement purpose and/or an associated procedure, or an indication thereof. Such a purpose and/or procedure may indicate to a WTRU one or more purposes of an RMR. For example, an RMR may be configured to be transmitted with one or more concurrent data transmissions. Such an RMR configuration may include, e.g., an association with a purpose of demodulation. For the same RMR, the RMR configuration may include, e.g., an association with a purpose of CSI feedback. In such an example, a WTRU may determine an association between a measurement configuration and one or more procedures (e.g., demodulation, mobility, radio link monitoring, etc.).

An RMR, RMR configuration, and/or RMR instantiation may include an RMR measurement configuration. An RMR measurement configuration may indicate to a WTRU a relationship between multiple RMRs and/or multiple resources of an RMR (e.g., where multiple resources of an RMR may, for example, be defined as each individual resource used within one instantiation of an RMR and/or where multiple resources of an RMR may be defined to be transmitted multiple times within a time period). A WTRU may be configured with multiple RMRs on which it may take the same measurement type. In such an example, an RMR measurement configuration may indicate to a WTRU that multiple (e.g., all) RMRs may be assumed to represent a same instantaneous channel realization. Such a WTRU may perform short-term channel measurements. Alternatively, or instead, an RMR measurement configuration may indicate to a WTRU that a set of configured RMRs (or a set of resources comprising an RMR) may be assumed to span multiple channel realizations. In such an example, the WTRU may perform long-term channel statistics type measurements.

An RMR, RMR configuration, and/or RMR instantiation may include an RMR measurement configuration that may be associated with an RMR process. Such a process may be associated with a set of RMR instances. An RMR configuration (e.g., a dynamically signaled RMR configuration) may indicate an RMR process ID, for example, via an information element (IE). This IE may indicate to the WTRU whether measurements taken on an RMR may be combined (e.g., averaged) with measurements taken on previous RMR instances of the identified RMR process.

An RMR, RMR configuration, and/or RMR instantiation may include an indication of RMR dependency. A first RMR or RMR process may be configured with a dependency on, or an association with, a second RMR or RMR process. A WTRU may modify its use of such a first RMR or RMR process based on the WTRU's use of the second RMR or RMR process. For example, a WTRU may be configured with a first RMR or RMR process that may have a purpose of channel estimation for demodulation. This first RMR or RMR process alone may not enable the WTRU to obtain adequate channel estimation. This WTRU may be configured with a second RMR or RMR process with which it may make one or more measurements that may improve the channel estimation performed using the first RMR or RMR process. A WTRU may obtain QCL information (e.g., Doppler shift, Doppler spread, average delay, delay spread) for the second RMR or RMR process and use such QCL information associated with the second RMR when performing channel estimation for the first RMR or RMR process. Alternatively, or instead, a first RMR or RMR process may be configured as a reference RMR or RMR process that may be used with a second RMR or RMR process that may be configured to have dependency on the reference (first) RMR or RMR process.

An RMR, RMR configuration, and/or RMR instantiation may include an indication of one or more associated TRPs and/or WTRUs. This indication may indicate a source of a signal that may be measured. Where a source of a signal that may be measured may be another WTRU, a TRP/WTRU value may correspond, for example, to an L2 WTRU identity that may be used for direct communications. Where a source of a signal that may be measured may be an eNodeB, a TRP/WTRU value may correspond to a cell ID, a TRP identity, a TRPG identity, and/or an access parameter (e.g., from an access table and/or from system information) thereof, for example.

Any one or more of the disclosed parameters of an RMR may be determined autonomously by a WTRU. A WTRU may autonomously determine that a set of RMRs or a set of resources comprising an RMR may cover an instantaneous channel realization. Alternatively, or in addition, a WTRU may autonomously determine that a set of RMRs or a set of resources comprising an RMR may cover multiple channel realizations. A WTRU may make such a determination based on, e.g., the WTRU's speed, delay spread estimate, coherence time, and/or coherence bandwidth.

A WTRU may indicate one or more of the WTRU's assumptions associated with an RMR configuration parameter to a network upon feeding back one or more measurements (e.g., where such one or more measurements may be associated with one or more respective values that may depend on the one or more of the WTRU's assumptions). A determination of whether to provide such assumptions and/or measurements to the network may be made as a function of another measurement result, such as results associated with a same or other set of RMRs. For example, a WTRU may measure a coherence time on a first set of RMRs and may use that value to determine autonomously whether a second set of RMRs may span a single channel realization or multiple channel realizations.

An RMR configuration, activation, and/or deactivation may be indicated to a WTRU in a dynamic manner. For example, an RMR configuration, activation, and/or deactivation may be TRP specific, group specific (e.g., for a subgroup of WTRUs served by a TRP and/or device), and/or WTRU-specific. Such an RMR configuration, activation, and/or deactivation may be indicated in a broadcast message.

An access table may be used to provide at least part of system information associated with a TRP. An access table may include one or more elements that may be used to configure one or more RMRs.

An RMR may be configured in or by WTRU-specific transmission of system information.

An RMR indication may be provided using a control channel and/or portions thereof. For example, Downlink Control Information (DCI) may be used to provide an RMR indication. An RMR configuration DCI may be transmitted to a WTRU or to a group of WTRUs. Such a DCI may include some or all RMR configurations.

An RMR may also, or instead, be used for cell-specific purposes. A WTRU may be configured with an RNTI (e.g. a RMR-RNTI) that may be used for reception of downlink control information (e.g., scheduling, activation, and/or deactivation) associated with an RMR for one or more purposes. A common RNTI may be used and configured on a WTRU. Purposes associated with an RMR may be one or more of performing mobility-related measurements, positioning, radio link monitoring, and cell acquisition.

A WTRU may decode a DCI associated with an RMR configuration in a common search space. Such a DCI may indicate one or more characteristics of an RMR and/or indicate a change of an activation state of an RMR. DCI indications may be used to provide dynamic control of one or more transmissions for common reference signals associated with one or more WTRUs and/or for any other one or more purposes.

An RMR indication using a DCI may also provide information associated with one or more other transmissions. For example, a DCI used for scheduling of one or more DL transmissions may also include an element that may be used to configure, activate, and/or deactivate an RMR.

An RMR indication may be used for one or more cell-specific purposes. RMR related control information may be included in a DCI that may schedule and/or indicate another transmission (e.g., one or more Multimedia Broadcast Multicast Services (MBMS) transmissions), a distinct positioning reference signal (PRS), and/or a system information broadcast.

An RMR indication may be implemented using a split DCI approach. For example, a WTRU may expect multi-step physical layer signaling (e.g., DCI). As used herein, "DCI" may refer to any physical layer signaling method.

Figure 6:
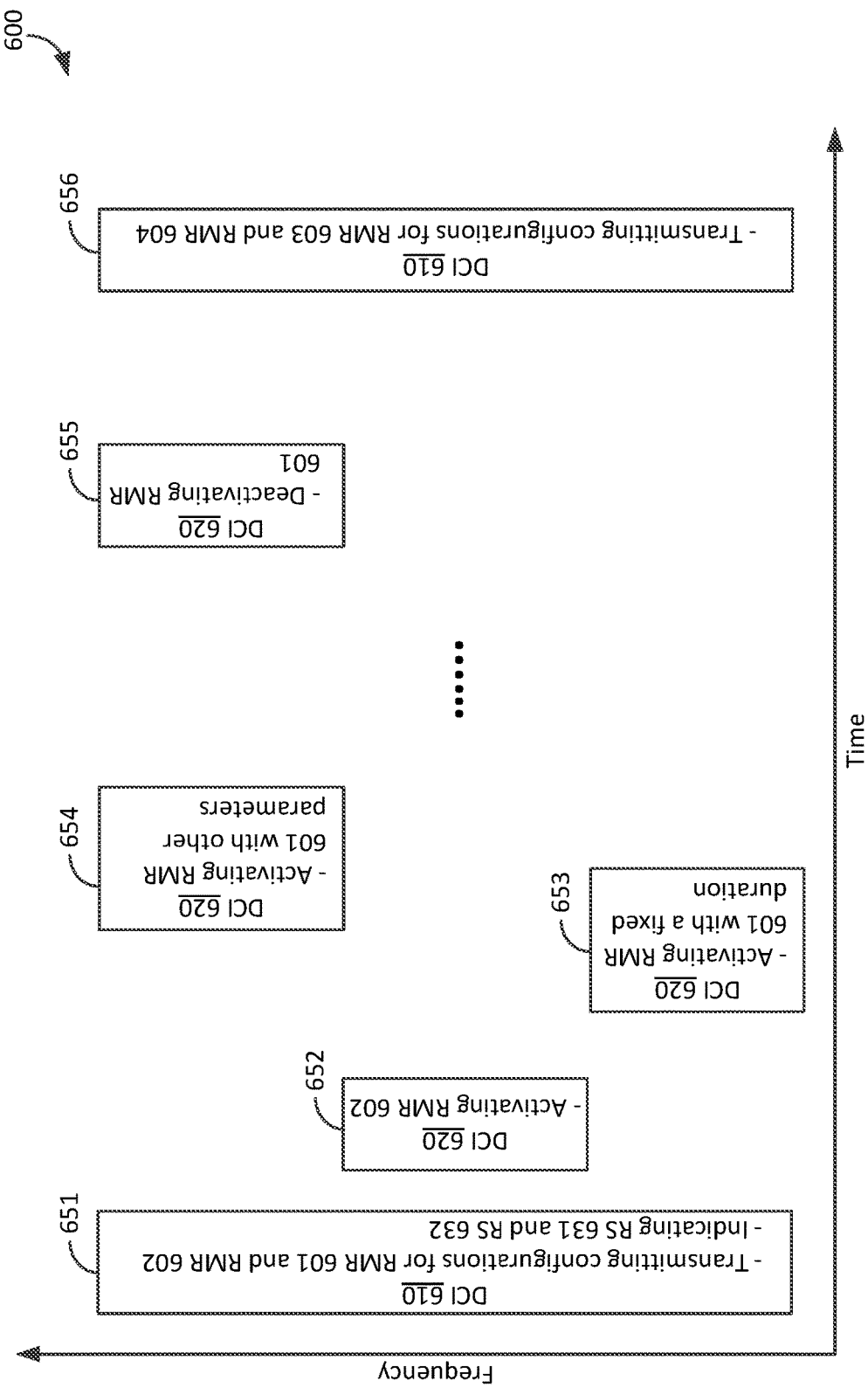
FIG. 6 is a diagram of an exemplary DCI configuration and activation/deactivation process.

A WTRU may expect a two-step DCI approach. FIG. 6 shows diagram 600 illustrating an exemplary DCI configuration and activation/deactivation process. At block 651, first DCI 610 (e.g., a long-term, a wideband, and/or a less frequent DCI, where a less frequent DCI may be applicable to multiple WTRUs) may be used to transmit a configuration of at least one RMR, such as RMRs 601 and 602. A configuration of first DCI 610 may include one, multiple (e.g., common to a plurality of WTRUs), or all (e.g., dedicated to a single WTRU) RMR parameters. First DCI 610 may also, or instead, indicate one or more RSs, such as RS 631 and RS 632, that may be used as resources, e.g., for one or measurements.

At block 652, second DCI 620 (e.g., a short-term, a subband, and/or a more frequently transmitted DCI that may be applicable to a single WTRU or transmission) may be used to provide parameters for a same RMR for which parameters may also be provided in first DCI 610, such as RMR 602. Second DCI 620 may indicate parameters associated with an RMR, such as RMR 602, that may change more often than those indicated in first DCI 610 (e.g., that may also be associated with RMR 602).

For example, a WTRU may receive, in first DCI 610 at block 651, parameters for an RMR and/or a reference to a configuration associated with an RMR (e.g., RMR 602). Such a WTRU may determine whether the WTRU is to perform further actions using such an RMR. In an example, reception of second DCI 620 at block 652 (e.g., that may be transmitted in a control region located in, or spanning, a subband or a channel controlling a subband) may trigger such a WTRU to expect an actual transmission of an RMR, in some examples, on a subband used by second DCI 620.

A WTRU may receive a DCI, such as second DCI 620 at block 652, that may indicate that one or more RMRs, such as RMR 602, may be turned on (e.g., activated and/or applicable for an associated transmission) or off (deactivated). For example, second DCI 620 may be used at block 652 to dynamically turn on and/or off RMR 602, e.g., on a specific time scale. Such a time scale may correspond to a symbol (or a plurality thereof), a subframe and/or TTI (or a plurality thereof), and/or a subband (or a plurality thereof).

A DCI, such as second DCI 620, may be used to dynamically turn on and/or off an RMR, such as one or both of RMR 601 and RMR 602, based on a configuration that may include, but is not limited to, parameters such as time, frequency, code, and/or space. Such parameters may be used to determine how and/or when to dynamically turn on and/or off an RMR. Alternatively, or in addition, a DCI such as second DCI 620 may indicate a purpose of an RMR for different subframes (or TTIs) and/or subbands.

Second DCI 620 may be used to change or adjust parameters of an RMR, such as RMR 601, within a relatively short timeframe. In an example, at block 653, second DCI 620 may activate RMR 601 with one or more parameters, such as a fixed duration (e.g., lifespan). In such an example, second DCI 620 may activate RMR 601 at block 654 with one or more parameters that may differ from those used at block 653.

Second DCI 620 may be used to deactivate an RMR, such as RMR 601. In an example, at block 655, second DCI 620 may deactivate RMR 601.

At block 656, first DCI 610 may be used to transmit a configuration of at least one other RMR, such as RMRs 603 and 604.

A second DCI, such as second DCI 620, may be applicable in one or more combinations with a first DCI, such as first DCI 610. A combination of an appropriate first DCI and an appropriate second DCI may be explicitly indicated (e.g., in a first and/or a second DCI such as first DCI 610 and second DCI 620). A first DCI, such as first DCI 610, may include scheduling information and/or presence information (e.g., a presence indication) for a second DCI, such as second DCI 620.

A relationship between a first DCI and a second DCI may be determined implicitly. A first DCI, such as first DCI 610, may be associated with a set of one or more subbands, symbols, and/or subframes. A second DCI, such as second DCI 620, that may be received by a WTRU within a set of subframes and/or subbands associated with such a first DCI may be assumed by such a WTRU to be associated with such a first DCI.

FIG. 7 shows diagram 700 illustrating an exemplary DCI process. At block 710, a WTRU may transmit a request on UL for one or more RSs, for example, where such a WTRU may determine that it may be experiencing a performance degradation. In an example, no such request may be transmitted.

At block 720, DCI 721 may indicate RS 731 and RS 741 on DL. DCI 721 may indicate that RS 731 and RS 741 may be resources that may be used for CSI measurement. RS 731 may be provided at block 730 and RS 741 may be provided at block 740.

At block 750, a subsequent DCI 751 may request CSI report 761 in DL. In an example, RS 731 may be associated with a signal while RS 741 may be associated with interference. Alternatively, RS 741 may be associated with a signal while RS 731 may be associated with interference. At block 761, CSI report 761 may be transmitted in UL.

A WTRU may miss an RMR activation. Such a WTRU may not perform one or more configured measurements. Measurement and/or channel estimation procedures associated with such an RMR (e.g., data demodulation, measurement feedback) may be difficult to perform. In some examples, such measurement procedures may not be able to be performed. In such an example, a WTRU may report a failure to perform an associated procedure, for example, to one or more associated serving TRPs. Such a WTRU may indicate a cause for the failure as lacking RMR.

A WTRU may miss an RMR deactivation. Such a WTRU may continue attempting to perform one or more measurements and/or other tasks associated with one or more purposes associated with the RMR for which a deactivation was missed. Such a WTRU may attempt to perform such one or more measurements and/or other tasks using one or more resources where the WTRU incorrectly expects the RMR to be present. In an example, a WTRU may be able to determine an abnormal change in one or more measurements that may have been taken on a first RMR instance based on a comparison with a second RMR instance that, for example, the WTRU may have assumed had some degree of dependence on the first RMR instance. Such a WTRU may report to a TRP that it experienced an unexpected change. Based on such a report, a TRP may determine that the WTRU has not successfully received the RMR deactivation.

An RMR process may include multiple RMR instances. A WTRU may expect similarity of measurements taken based on different RMR instances of a first RMR process. If a measurement changes by, e.g., a threshold amount (that may be configurable), a WTRU may determine that an unexpected change may have occurred and may provide an indication of such an unexpected change to a TRP.

A WTRU may use an RMR process for channel estimation and/or may determine that a signal strength has changed by more than a threshold amount over, e.g., two consecutive RMR values. Such a WTRU may indicate such a determination to a TRP.

A WTRU may acknowledge a reception of an RMR deactivation and/or an RMR activation. A WTRU may acknowledge a reception of an RMR deactivation and/or an RMR activation for one or more long-term RMR processes. A WTRU may indicate one or more RMR instances for which feedback measurements may be applicable.

A presence of an RMR may be indicated to a WTRU in an implicit manner. For example, a WTRU may determine a presence of an RMR via implicit means. A DCI that may grant one or more DL resources may implicitly configure, activate (e.g., applicable to one or more transmissions), and/or indicate (e.g., applicable to an associated transmission), a presence of an RMR, for example, for use in demodulating one or more DL transmissions.

A presence of an RMR may be determined upon requesting a measurement feedback from a WTRU.

A reception of a second RMR may depend on a reception of a first RMR. For example, a WTRU may be configured and/or activated by a first RMR that may include or be associated with to be transmitted, and such a configuration may implicitly indicate to a WTRU a presence of a first RMR.

The reception of one or more reference signals, or one or more measurements thereof, for a second RMR may have a dependency on the reception of a first RMR. For example, a WTRU may be configured with, and/or activated to expect a presence of, a first RMR that may indicate a similar configuration and/or activation state (e.g., activation or presence) of a second RMR. Such a WTRU may receive and/or perform a measurement on such a first RMR to determine an outcome that may be used, e.g., to trigger one or more measurements on such a second RMR.

An indication of an RMR may be determined, e.g., implicitly, based on a configured change in one or more transmission parameters. A WTRU may receive an indication and/or instruction to reconfigure a SOM, a frame structure, and/or a signal structure. An associated RMR may also be reconfigured. Such an RMR reconfiguration may be predetermined.

An RMR reconfiguration may be based on a function of a new signal structure. Alternatively, or in addition, an RMR configuration may be assumed to be associated with a signal structure. A change in such a signal structure may indicate a deactivation of the associated RMR. A WTRU may store RMR configurations for one or more transmission parameters (such as signal structures). Upon being reconfigured to use, e.g., a set of previously used transmission parameters, such a WTRU may reuse one or more previously configured RMRs and/or one or more RMR configurations associated with such a set of transmission parameters.

An RMR configuration may be associated with one or more TRPs, TRPGs, system signatures, cell identities, or the like, or any combination thereof. A reconfiguration of a WTRU that may modify one or more of such TRPs, TRPGs, system signatures, cell identities, or the like, or any combination thereof (e.g., a mobility event) may reconfigure an associated RMR configuration. For example, a WTRU may determine an applicable RMR configuration based on a preconfiguration and/or a list of RMR configurations, each of which may be associated with one or more TRPs, TRPGs, system signatures, cell identities, or the like, or any combination thereof.

An exemplary frame structure may be used for one or more DL and/or UL transmissions that may be transmitted to and/or received from a WTRU. Such an exemplary frame structure may include a preamble that may be transmitted by a TRP and received by a WTRU and/or another TRP. This preamble may be transmitted and/or received prior to or at the beginning of a frame structure, in some examples, immediately prior to the beginning of a frame structure. Such a preamble may include an RMR that may be configured semi-statically. Such an RMR may enable the demodulation of information that may be transmitted within a preamble.

A preamble may contain an RMR (e.g., an RMR that may be transmitted concurrent to a preamble) that may be used for one or more control regions that may be in at least one of a set of frames and/or subframes for which such a preamble may be transmitted. Alternatively, or instead, a preamble may include an indication to a WTRU indicating and/or instructing such a WTRU to determine a presence and/or one or more parameters of an RMR that may be used one or more control regions in at least one of a set of frames and/or subframes for which such a preamble may be transmitted. A transmission of a preamble may include a transmission of a DCI, such as, but not limited to, a first DCI and/or a second DCI as described herein.

A preamble may include a configuration for one or more RMRs. An RMR configuration associated and/or included with such a preamble may be valid for a frame or set of frames for which the preamble may be transmitted. An RMR configuration associated and/or included with such a preamble may be valid for a subset of frames (or subframes) for which the preamble was transmitted. A preamble transmission may include the transmission of a DCI, such as, but not limited to, a first DCI and/or a second DCI as described herein.

A WTRU may determine an RMR that may be applicable for one or more downlink and/or uplink transmissions for one or more TRPs, TRPGs, system signatures, cell identities, or the like, or any combination thereof. Alternatively, or in addition, a WTRU may determine an RMR that may be applicable for one or more downlink and/or uplink transmissions that may contain a random access response (RAR) that may be a function of a transmission of a random access (RA) preamble. Alternatively, or in addition, a WTRU may determine an RMR that may be applicable for a transmission that may include an RAR as a function of an identity of one or more TRPs, TRPGs, system signatures, cell identities, or the like, or any combination thereof.

An RMR may be applicable until a WTRU may be reconfigured with an RMR (e.g., alternative RMR parameters) using dedicated signaling. Such an RMR may be applicable for transmissions associated with one or more procedures, e.g., for a random access procedure, during a mobility-related procedure, for a mobility-related reconfiguration, and/or until the WTRU may receive dedicated signaling for an applicable Uu association. For example, a WTRU may determine an applicable RMR as a function of one or more resources that may be used use in time and/or/frequency for a transmission of an RA preamble and/or as a function of an RMR used for transmission of a RA preamble. Such a determination may be performed as a function of an RA-RNTI that may be applicable to reception of an associated RAR. In an example, such a determination may be performed in combination with an applicable identity.

A WTRU may be configured to determine an RMR (e.g., implicitly determine an RMR) based on one or more resources that may be being used for data transmission and/or reception. A first WTRU may establish a connection with, or may otherwise enter into communication with, another (second) WTRU. The first and second WTRUs may determine a set of one or more resources that may be used for communicating with each other. One of such WTRUs that may be a transmitting WTRU may choose a set of resources for one or more transmissions for a given time period (e.g., a scheduling period). An associated RMR may be valid for the duration of the given time period (e.g., a scheduling period). Alternatively, or in addition, an RMR may be defined as a part of one or more resources definitions.

A WTRU may determine that it may use a transmission of one or more RMRs and/or a reconfiguration of one or more existing RMRs for various functions. A WTRU may support an on-demand PRS request mechanism for, e.g., positioning purposes. Such a request may include and/or indicate one or more request parameters, such as one or more of an applicable procedure, a desired accuracy, a speed estimation, and the like. A WTRU may support an on-demand RMR request mechanism to perform WTRU-autonomous mobility.

A WTRU may request a transmission of an RMR, for example, by transmitting an RMR request in a UL transmission. A WTRU may have periodic UL resources within which it may request an RMR. Such a WTRU may transmit a signal when it desires a transmission of one or more RMRs and it may remain silent when it does not desire a transmission of one or more RMRs. A WTRU may transmit a codepoint that may indicate whether the WTRU desires an RMR.

A WTRU may "piggyback" an RMR request on a UL transmission that may include one or more requests, information, and/or any other data that is not an RMR request (e.g., a WTRU may transmit an RMR request such that it accompanies a UL transmission that otherwise may not be an RMR request). A WTRU may be granted UL resources for a transmission of data and such a WTRU may append an RMR request to the granted UL resources. Alternatively, or in addition, a WTRU may have UL feedback that it may wish to transmit and may append to an RMR request that it may send to with UL feedback and/or one or more UCI transmissions. In an example, a WTRU may transmit UL HARQ after a DL transmission. In an example, a WTRU may have feedback to report based on a prior RMR configuration. Such a WTRU may, along with such feedback, include a request for a change of RMR configuration with a transmission providing such feedback. A WTRU may indicate to a TRP that the WTRU may desire s transmission of one or more RMRs in one or more HARQ feedback resources.

A WTRU may use a UL control region to indicate a request for an RMR. A WTRU may autonomously schedule UL transmissions and may do so using a UL control region. A channel within a control region (or a field in UCI transmitted in a UL control region) may be used by such a WTRU to request one or more RMR transmissions.

A WTRU request for an RMR may include one or more parameters of an RMR, such as an indication of a purpose of an RMR. Such a request may indicate one or more aspects of an RMR implicitly (e.g., by using an indication of a purpose of an RMR) as a function of a resource (e.g., in time, frequency, space, and/or applicable numerology) used for the request, a codepoint, and/or any other aspect that may be associated with a transmission of the request.

A WTRU may be triggered to request a transmission or reconfiguration of an RMR by one or more various criteria and/or events. Such a criterion and/or event may be a change in demodulation performance. Where a WTRU may not receive an RMR used for demodulation in every DL transmission, such a WTRU may determine a change in SINR of a received DL transmission as compared to a previous DL transmission.

A WTRU may determine that performance of the WTRU's decoder has changed. Such a WTRU may be triggered to request a new or reconfigured RMR that may be used for channel estimation in a demodulation of one or more future and/or previous DL transmissions. For example, a WTRU may be scheduled with one or more DL transmissions and may determine that its channel estimation may be out of date. Such a WTRU may buffer one or more DL transmissions and may request transmission of an RMR to use in demodulating such with one or more scheduled DL transmissions.

A WTRU may be triggered to request a transmission or reconfiguration of an RMR based on a desire for a retransmission. Such a WTRU may be triggered to request an RMR upon receipt of a predetermined, or a dynamically determined, number of NACKs for a same or multiple transport blocks. Such a WTRU may also, or instead, be triggered to request an RMR upon receipt of a predetermined, or a dynamically determined, number of NACKs received from a same or different TRP. Such a WTRU may also, or instead, be triggered to request a reconfiguration of an RMR based on receiving a number of NACKs for a same or multiple transport blocks or from a same or different TRP. Such a requested reconfiguration may be associated with a density different than that of the RMR requested to be reconfigured. Such a density may enable and/or facilitate performance that may be different than performance associated with that of the RMR requested to be reconfigured.

A WTRU may provide augmented HARQ feedback. A WTRU may include one or more channel estimation performance values (e.g., SINR, average SINR, variance of measurements, maximum measurement, minimum measurement) in a HARQ report. Such one or more channel estimation performance values may be included when a HARQ report is a NACK, in some examples when such a HARQ report is a NACK for one or more specific retransmission values. A WTRU may explicitly indicate in a HARQ feedback whether the WTRU desires a change in an RMR or RMR configuration, in an example, where such an RMR may be associated with one or more HARQ process. A WTRU may indicate in a HARQ feedback report that it desires a new or modified RMR, where such a new or modified RMR may be associated with a purpose. In an example, a WTRU may indicate that it desires a new or modified RMR associated with a purpose of performing one or more mobility measurements, for example, due to performance of one or more current transport block transmissions.

A WTRU may be triggered to request a transmission or reconfiguration of an RMR based on a measurement of an RMR. In an example, a WTRU may be configured with a first RMR that, for example, may be used for coarse measurements. Such a WTRU may use one or more triggers (e.g., based on one or more measurement thresholds) to determine whether a second RMR to perform finer measurements may be requested. One or more coarse measurements taken on a first RMR or a first set of RMRs may or may not be fed back to a TRP by a WTRU. If a WTRU reports the one or more coarser measurements, such a report may be an implicit indication of a request for a second RMR or a second set of RMRs.

A WTRU may be triggered to request a transmission or reconfiguration of an RMR based on a down-selection of one or more transmission hypotheses. In an example, a WTRU may obtain a first type of one or more measurements on a first RMR or a first set of RMRs. Based on such one or more measurements, such a WTRU may be triggered to request a second RMR or a second set of RMRs that may be used to obtain a second type of one or more measurements, e.g., for fewer transmission hypotheses than the first RMR or the first set of RMRs may have supported. In an example, a WTRU may measure coarse channel state information for a first set of beams that may be associated with a first RMR or a first set of RMRs. Such a WTRU may use such coarse channel state information measurements, in some examples along with one or more measurement thresholds, to down-select to a second set of potential beams having fewer beams than the first set of beams. Such a WTRU may request that a TRP transmit a second RMR or a second set of RMRs that may be associated with the second set of potential beams and/or that may enable one or more finer measurements.

A WTRU may be triggered to request a transmission or reconfiguration of an RMR based on an indication from a TRP. A WTRU may receive an indication from a first TRP that may instruct the WTRU to report feedback on one or more measurements of a second TRP. A WTRU may determine interference that it may receive from a first TRP in one or more DL transmissions from a second TRP. Such a WTRU may request an RMR from the first TRP.

A WTRU may be triggered to request a transmission or reconfiguration of an RMR based on a transmission from a TRP. A WTRU may be capable of full duplex radio. Such a WTRU may be scheduled for receipt of a DL transmission from a first TRP at a same, or temporally proximate, time that the WTRU may also be scheduled to transmit a UL transmission to a second TRP. Upon being scheduled for the UL transmission to the second TRP, such a WTRU may request an RMR from the first TRP.

A WTRU may be triggered to request a transmission or reconfiguration of an RMR based on a change of RMR desires of the WTRU. Such a WTRU may desire a first RMR or a first set of RMRs associated with a first one or more RMR parameters based on a status of the WTRU (e.g., speed). As the WTRU's status changes (e.g., as its speed changes), such a WTRU may desire a change in one or more RMR parameters or an entirely new set of one or more RMRs. A WTRU may change from using a first type of connection (e.g., a light connection) that may use a first RMR to a second type of connection (e.g., fully connected) that may use a second RMR, and may therefore request a transmission or reconfiguration of an RMR based on such a change.

A WTRU may be triggered to request a transmission or reconfiguration of an RMR based on a detection of a collision. A WTRU may be configured to determine when a resource collision occurs (e.g., on a sidelink) and may be configured to request an RMR associated with one or more network and/or neighbor devices.

A WTRU may be triggered to request a transmission or reconfiguration of an RMR based on WTRU-autonomous mobility. A WTRU may be configured to autonomously determine a suitable (e.g., a set thereof) TRP, TRPG, system signature, and/or cell. Such a WTRU may initiate a request for an RMR upon initiating a selection procedure for such a suitable TRP, TRPG, system signature, and/or cell. Such a request for an RMR may correspond to a transmission of a preamble on a specific resource, such as a resource determined based on an access table.

A WTRU may be triggered to request a transmission or reconfiguration of an RMR based on a position of the WTRU. A WTRU may be configured to determine its position. A position of a WTRU that may be determined by the WTRU may be associated with a granularity and/or an error margin. A WTRU may initiate (e.g., may be triggered to initiate) a request for an RMR when such a WTRU may determine that it may refine a current position and/or obtain another position, e.g., a position that may be more granular, more specific, and/or may have a lower error margin. A requested RMR may be used as a PRS, for example, when a WTRU determines that a position may be obtained and/or determined.

A WTRU may have, obtain, and/or determine, a coarse position and/or coarse position information. Such a WTRU may further determine that additional refinement of such a coarse position and/or coarse position information may be performed. Such a WTRU may initiate a request for, e.g., a purpose of increasing a frequency of such a PRS and/or for a purpose of having a PRS signal with one or more different characteristics (e.g., in time and/or in frequency). Such a determination for additional refinement may be based on a configuration of one or more RMRs for a purpose of positioning, for example, where different RMR-PRSs may be associated with different granularities.

A WTRU may be triggered to request a transmission or reconfiguration of an RMR based on radio link monitoring and/or radio link recovery. A WTRU may determine that it is and/or has experienced one or more radio link problems. This determination may be based on any of a variety of measurements, such as, but not limited to, measurements using an RMR and measurements based on methods that may be similar to those used in LTE systems (e.g., out-of-sync detection). In an example, a WTRU may determine that it may use one or more reference signals to perform radio link and/or channel quality estimation, where such estimations may be used to address one or more radio link problems. In such examples, in response to determining that the WTRU may use one or more reference signals to perform radio link and/or channel quality estimation to address one or more radio link problems. For example, a WTRU may initiate a request for an RMR, e.g., for recovery purposes and/or for validation of a radio link problem.

A TRP may indicate a presence of a WTRU requested RMR, for example, in a manner similar to that described herein for an indication of any RMR. A TRP may indicate an acknowledgement that a change in one or more RMR parameters that may have been requested by a WTRU has been made. For example, there may be one or more predetermined values of an RMR density. A WTRU may be configured with a first value of an RMR density. Such a WTRU may request a change of RMR density to a second value. A TRP may transmit an acknowledgement indicating that the requested change has been made without retransmitting all of an RMR configuration.

A WTRU may request one or more resources that it may use to transmit an RMR. An event, such as, but not limited to, any of the events set forth herein, that may trigger a request from a WTRU for DL transmission of one or more RMRs may trigger such a WTRU to request one or more resources that may be used to transmit an UL RMR. An event that may trigger a WTRU to request UL transmission of RMR may be a detected as a desire to transmit UL or SL data. In an example, a WTRU may be capable of WTRU-autonomous transmission of data and may include RMR to enable demodulation.

An event, such as, but not limited to, any of the events set forth herein, may trigger a WTRU to perform a UL transmission of an RMR autonomously. A WTRU may have preconfigured resources on which it may transmit an event-triggered UL RMR. Such resources may be configured for a set of WTRUs and/or may be contention-based. Each WTRU within such a set of WTRUs may have an RMR transmission identity. One or more parameters of an RMR transmission may depend on a WTRU identity, for example, to facilitate contention resolution.

A WTRU may be configured to perform and/or report one or more measurements associated with one or more RMRs. A measurement configuration may be implemented concurrently with configuration of one or more RMRs and/or with configuration of one or more feedback resources. For example, a WTRU may be configured with a measurement and/or one or more feedback resources, and may receive an indication from a TRP instructing such a WTRU to associate one or more measurements and/or one or more feedback resources to one or more RMRs. For example, a WTRU may be indicated (e.g., receive an indication message indicating) a presence of at least one instance of an RMR, at least one relevant measurement (or measurement purpose), and/or at least one instance of a feedback resource. In an example, an indication message may indicate one or more of each of a presence of an instance of an RMR, a relevant measurement (or measurement purpose), and an instance of a feedback resource.

A measurement configuration may be associated with an RMR that may be semi-statically configured. For example, an RMR located within a preamble or a control channel may be semi-statically configured. A measurement configuration may also, or instead, be associated with a dynamically controlled RMR.

A measurement configuration may be used for periodic feedback, aperiodic feedback, and/or triggered feedback. A measurement configuration may include configuration and/or activation information for one or more RMRs. For example, a measurement feedback configuration may include and/or refer to one or more RMR configurations.

A measurement configuration may include a subset of an RMR configuration. A measurement configuration may apply to a subset of resources of an RMR. In an example, an RMR may be transmitted on resources spanning multiple subcarriers while a measurement configuration may be applicable to a subset of such multiple subcarriers. An RMR may be transmitted on resources that may span multiple symbols, subframes, and/or TTIs while a measurement configuration may be applicable to a subset of multiple symbols, subframes, and/or TTIs.

A measurement configuration may include one or more WTRU rules for down-selecting one or more RMRs. A measurement configuration may be tied to an RMR and/or an RMR process. A WTRU may determine a subset of RMR instances or RMR resources associated with an RMR configuration. Such a WTRU may perform one or more measurements on such a subset of RMR instances or RMR resources. Such one or more measurements may each be a final measurement that may be reported back to a network. One or more rules that a WTRU may follow when down-selecting RMR instances and/or RMR resources may be predetermined, previously configured, and/or dynamically configured and/or determined.

A measurement configuration may include an RMR measurement configuration. Such an RMR measurement configuration may indicate to a WTRU a relationship between multiple RMRs and/or multiple resources of an RMR (e.g., where multiple resources of an RMR may, for example, be defined as each individual resource used to make up one instantiation of an RMR or where each instantiation of an RMR may be defined to be transmitted multiple times within a time period).

A WTRU may be configured with multiple RMRs upon each of which such a WTRU may take a same measurement type. An RMR measurement configuration may indicate to a WTRU that all of such multiple RMRs may represent a same instantaneous channel realization. In an example, a WTRU may perform short-term channel measurements. In an example, an RMR measurement configuration may indicate to a WTRU that a set of configured RMRs (or a set of resources associated with one or more RMRs) may span multiple channel realizations or may be assumed to span multiple channel realizations. Such a WTRU may perform long-term channel measurements (e.g., long-term channel statistics-type measurements).

A WTRU may be configured with an RMR process. Such an RMR process may be associated with a set of one or more RMR instances. A measurement configuration (e.g., a configuration provided by dynamic signaling) may indicate a set of RMR instances associated with such an RMR process that may be combined (e.g., averaged) to obtain a measurement. Such a measurement configuration may indicate one or more RMRs, RMR processes, and/or RMR instances associated with an RMR and/or an RMR process. Such a measurement configuration may indicate a measurement purpose for at least one of an RMR, an RMR process, or an RMR instance. For example, such a measurement configuration may include multiple RMRs (or indications thereof), each of which may be associated with a different measurement purpose (e.g., a first RMR may be used by a WTRU to measure signal strength, a second RMR may be used by a WTRU to measure Doppler, a third RMR may be used by a WTRU to measure channel occupancy, etc.).

A measurement configuration may include one or more measurement types. A measurement type may be, but need not be, similar to a measurement purpose, such as, but not limited to, those described herein. A measurement type may indicate to a WTRU that a (e.g., specific) CSI measurement may be performed on an associated RMR. A measurement type may be obtained based on a function of a set of measurements that may be taken of one or more RMRs. For example, a WTRU may obtain a first measurement on a first RMR (or RMR process or RMR instance) and a second measurement on a second RMR (or RMR process or RMR instance). A measurement type indicated in a measurement configuration may indicate to such a WTRU a function that the WTRU may use to combine the first measurement and the second measurements to determine or generate a third measurement. Such a third measurement may be an intended result of the measurement configuration and/or may be used to determine whether a trigger event or criterion has been met, where such a trigger event or criterion may, if met, trigger a measurement report.

A measurement configuration may include one or more measurement feedback resources. Such one or more measurement feedback resources may be used by a WTRU to report feedback, e.g., periodically, aperiodically, and/or triggered.

A measurement configuration may include an indication of a purpose of a measurement or an associated procedure. A measurement configuration may indicate and/or be associated with a single purpose associated with one or more RMRs. Alternatively, or in addition, a measurement configuration may indicate and/or be associated with multiple purposes associated with one or more RMRs. In an example, a WTRU may determine an association between a measurement configuration and a procedure (such as, e.g., demodulation, mobility, radio link monitoring, etc.).

A WTRU may not store and/or otherwise maintain access to one or more measurements that the WTRU may have performed, accessed, and/or obtained. A measurement configuration may include one or more measurement triggers, each of which may trigger an associated WTRU to perform one or more measurements.

A measurement trigger configured at a first measurement configuration may be associated with one or more results of one or more measurements that may be performed based on a second measurement configuration. Such a second measurement configuration may configure a WTRU to perform one or more measurements, such as, but not limited to, collection of long-term channel statistics on a second RMR that may be associated with the second measurement configuration. Based on such one or more such measurements and associated trigger, a WTRU may be triggered to perform one or more measurements that may be configured at a first measurement configuration. Additionally, or instead, a WTRU may be triggered by a trigger that may be provided in a first measurement configuration, A measurement configuration may indicate to a WTRU a list of one or more measurements that may be disjoint RMRs, RMR processes, and/or RMR instances. Alternatively, such a list may be of one or more measurements that may not be disjoint RMRs, RMR processes, and/or RMR instances. A measurement configuration may indicate one or more measurement triggers that may be used to initiate a determination of whether a subsequent measurement is to be obtained. In an example, a WTRU may be configured with a first measurement on a first RMR and a second measurement on a second RMR. Such a WTRU may also be configured with a measurement trigger that may be based on such a first measurement, such as, e.g., a trigger based on achieving a threshold. Upon such a first measurement satisfying a triggering condition of such a measurement trigger or otherwise activating such a measurement trigger (e.g., where such a first measurement meets or exceeds a threshold), the WTRU may perform and/or calculate a third measurement. Such a third measurement may be of a third RMR and/or a function of the first and/or second measurements.

In an example, a WTRU may receive downlink control information (e.g., a DCI) that may trigger a measurement. Such DCI may include an RMR configuration and/or an identity of an applicable RMR configuration. Such DCI may also, or instead, include scheduling information for a report that may be associated with a triggered measurement.

A measurement configuration may include one or more reporting triggers. A WTRU may not report all measurements configured by a measurement configuration. Such a measurement configuration may provide one or more criteria that may be used to trigger a WTRU to report a measurement. In an example, a WTRU may receive downlink control information (e.g., a DCI) that may trigger a measurement report. Such DCI may include an identity of an applicable RMR configuration. Such DCI may also, or instead, include scheduling information that may be associated with a report that may be associated with a triggered measurement.

A measurement configuration may include an indication of one or more associated TRPs, TRPGs, system signatures, cells, and device identities. Such a measurement configuration may provide a TRP or a set of TRPs and/or a WTRU or set of WTRU devices to which such a measurement may apply.

A measurement configuration may include a random access configuration. A WTRU may be configured with one or more RMRs, and/or information associated therewith. Each of such RMRs may assist or otherwise facilitate one or more of cell, TRP, TRPG, and/or system signature selection.

A WTRU may be configured with one or more access-related parameters, such as access rights, random access parameters, and/or the like, any of which may be associated with one or more RMRs configured, or associated with information configured, at the WTRU. Such a WTRU may perform one or more measurements using such one or more RMR configurations or information. Such a WTRU may determine whether one or more of such measurements resulted in suitable or otherwise compliant results.

Such a WTRU may compare or otherwise use an access-related parameter associated with an RMR to determine whether a configuration associated with such an RMR may correspond to an associated cell, TRP, TRPG, and/or system signature. If such a cell, TRP, TRPG, and/or system signature is determined to correspond to such an RMR, the WTRU may initiate access of, and, in some examples, perform random access of, such an RMR using such parameters. Such a WTRU may perform such a comparison and/or use of access-related parameters to determine whether a configuration associated with any of such RMRs corresponds to a cell, TRP, TRPG, and/or system signature, and to determine whether to initiate access (e.g., random access) of any such RMRs using associated parameters.

In WTRU-autonomous mobility examples, a WTRU may use an RMR to determine whether such a WTRU considers a cell, TRP, TRPG, and/or system signature associated with such an RMR as a serving cell, serving TRP, serving TRPG, and/or serving system signature ("serving set"), respectively. Such a WTRU may determine that a different RMR is to be associated with a serving cell, serving TRP, serving TRPG, and/or serving system signature.

Where an RMR may be added to a serving set, a WTRU may determine whether a cell, TRP, TRPG, and/or system signature associated with such an added RMR may be part of a same area as a cell, TRP, TRPG, and/or system signature previously associated with such a serving set. If not, such a WTRU may use the access parameters associated with such an added RMR to perform one or more functions, such as, but not limited to, a location update that may, in an example, be RAN-based.

A WTRU may be configured with a measurement configuration via higher layer signaling. A WTRU may be configured with a DL transmission mode. Such a transmission mode may include one or more of a TTI duration, a signal structure, and an RMR. A measurement configuration may be applied concurrently with a transmission mode configuration. Such a measurement configuration may provide an indication of a purpose of an RMR (e.g., demodulation).

A measurement configuration may be controlled dynamically. A dynamic measurement configuration may be performed or otherwise implemented by a DCI (or other control channel) that may configure an RMR. A DCI may be transmitted in a control region to provide a measurement configuration. In an example, a dedicated DCI that may be used for an RMR configuration may be used for a measurement configuration. In an example, a first (e.g., long-term or wideband) DCI may configure one or more RMRs and a second (e.g., short-term or subband) DCI may provide one or more measurement configurations. Such one or more RMRs may be present over resources that may be covered by such a first DCI while such one or more measurement configurations may apply to resources (e.g., subframes or symbols, subcarriers, or subbands) covered by such a second DCI.

A dynamic measurement configuration may be performed or otherwise implemented by a DCI (or other control channel) that may schedule DL transmissions. A DCI scheduling a DL transmission may include an associated measurement configuration. Such a measurement configuration may be used to map an RMR that may be used for demodulation of the associated DL transmission.

A dynamic measurement configuration may be performed or otherwise implemented by a MAC Control Element ("MAC CE"). A WTRU may receive a MAC CE that may include one or more measurement configurations. Such a MAC CE may be included in a RAR. Such a MAC CE may be received on a downlink transmission. A WTRU may determine that such one or more measurement configurations included with such a received MAC CE may be applicable to a SOM that may be associated with a physical channel, a transport channel, and/or a control channel associated with the downlink transmission that included such a MAC CE.

A WTRU may report measurements in resources that may be configured by a TRP. Configuration of a feedback resource may be performed within a measurement configuration. A WTRU may report information based on its own measurements as well as, or instead of, reporting measurements that may address one or more purposes, such as, but not limited to, any one or more purposes that may be set forth herein and for which a WTRU may perform measurements.

A WTRU may report a value that may be based on a performed measurement. A purpose associated with such a performed measurement may provide for one or more various feedback reports, each of which may depend on the performed measurement. In an example, a WTRU may report a quantized version of a taken measurement. In an example, a WTRU may provide a feedback report based upon one or more measurement thresholds associated with one or more obtained measurements.

A WTRU may report different levels and/or types of channel usage depending on a measurement taken. Such a WTRU may be configured with an RMR (e.g., a blanked RMR) on which it may attempt to detect interference and an interference type. Such a WTRU may feed back a type of channel usage that may have been encountered on the configured RMR. Alternatively, or in addition, such a WTRU may feed back a type of channel structure that may have been encountered on the configured RMR.

A value reported by a WTRU may be based on one or more sub-RMR measurements. A WTRU may be configured with an RMR or an RMR process on which it may perform one or more measurements. Such a WTRU may be configured to, or may autonomously, determine one or more subsets of the configured RMR or RMR process and may perform one or more individual measurements on such one or more subsets. Such a WTRU may report an overall measurement (e.g., an average measurement) for all resources of the configured RMR or RMR process. Alternatively, or in addition, such a WTRU may report one or more individual sub-RMR or sub-RMR process measurements. In an example, a WTRU may be configured with an RMR process on which to measure interference. Such a WTRU may determine that interference is not uniform over resources of the RMR process. Such a WTRU may feed back multiple interference values. Such interference values may be fed back with indications of respective associated RMR resources. Faster adaptations to channels with unexpected interference changes (e.g., due to URLLC transmissions) may be facilitated in such examples.

A WTRU may be configured with an RMR that may span multiple resources, where each such resource may be tied to a different antenna port. Such a WTRU may determine a subset of resources for which a measurement may be valid. Such a WTRU may also, or instead, report to a network a subset of resources of an RMR and/or an RMR process for which a measurement may be valid. In an example, such a WTRU may use one or more sub-RMR resource identifiers with such a report.

A WTRU may report one or more requests for one or more new and/or updated RMRs.

A WTRU may report one or more sets of RMRs and/or RMR sub-resources over which a measurement may be valid. A WTRU may indicate whether such a measurement may be assumed for a single channel realization or a function of multiple channel realizations.

A WTRU may provide an indication (or indications) of each RMR of a set of one or more RMRs upon which such a WTRU may have performed one or measurements that the WTRU may use to perform a function that may determine and/or obtain a measurement that is to be reported. A WTRU may be configured with a first RMR for which a first measurement may be performed and a second RMR for which a second measurement may be performed. Such a WTRU may be configured to perform a function that may use such a first measurement and second measurement to obtain a third measurement and/or result.

A WTRU may report one or more sets of resources (e.g., symbol, subframe, subframe set, TTI, frame, configurable unit of time, subcarrier, subband, configurable frequency blocks, etc.) for which a measurement may be valid. Such a WTRU may report wideband and/or subband measurements. Such a WTRU may also, or instead, report long-term and/or short-term measurements. Measurement types that may be reported by such a WTRU (e.g., RI, CQI, PMI, etc.) may be defined similarly and/or separately for each of one or more long-term measurements and one or more short-term measurements. One or more long-term measurements may indicate statistical performance of a channel. A WTRU may report average use of such a channel by other TRPs and/or WTRUs. One or more short-term measurements may indicate one or more instantaneous channel characteristics. A WTRU may report whether a channel may be in use currently.

A WTRU may report a reason that a measurement may have been triggered. Such reporting may indicate when a trigger may not have been a function of a measurement. In an example, a first measurement may be reported due to a second measurement triggering the transmission of a feedback report.

A WTRU may report an RMR ID and/or an associated TRP, TRPG, system signature, cell, and/or WTRU ID.

A feedback resource may be included in a measurement configuration. A feedback resource may be transmitted independently of a measurement resource. In an example, a WTRU may receive an RMR configuration that may indicate an activation of an RMR. Such a WTRU may receive a measurement configuration that may indicate an activation of a measurement to be performed on the RMR associated with the received RMR configuration. Such a WTRU may receive, in some examples after receiving such a measurement configuration, a feedback resource configuration that may indicate one or more resources on which a measurement may be fed back.

While feedback resources and/or indications thereof may be included in a measurement configuration and/or provided independently of a measurement resource, feedback resources may be also, or instead, be configured by a DCI. For example, a DCI may be defined as indicating one or more feedback resources to a WTRU. Such a DCI may, or may not, be dedicated to indicating one or more feedback resources to a WTRU. A two-part approach may be used, where a first (e.g., long-term or wideband) DCI may be used to provide one or more feedback parameters and a second (e.g., short-term or subband) DCI may be used to provide one or more other feedback parameters. Such a second DCI may be used to dynamically activate or deactivate one or more feedback resources on a subset of channel resources (e.g., a subset of a total bandwidth or a subset of symbols).

Feedback resources may also, or instead, be configured by and/or included with a DCI that may be used for granting UL resources. Such UL resources may be used for UL data transmission. Such UL resources may be used for transmission of uplink control information (UCI).

Feedback resources may also, or instead, be configured by and/or included with a DCI for a self-contained subframe transmission. Such a DCI may be transmitted in a DL control region of a self-contained subframe. Such a DCI may serve one or more purposes. In an example, such a DCI may assign DL resources and/or UL feedback resources. Such a DCI may include a feedback configuration that may provide resources that may be used to feed back measurements.

A DCI may be used to dynamically activate or deactivate one or more feedback resources on a subset of channel resources (e.g., a subset of a total bandwidth, a subset of symbols). A DCI may indicate an index to a configuration that may be associated with one or more purposes, including, but not limited to, any purpose described herein.

A WTRU may be configured to report measurements (e.g., CSI reporting) based on a set of dependent reference measurement resources, measurement configurations, and/or feedback resource configurations. A WTRU may also, or instead, be configured with, and/or may include indications of, one or more reference measurement resources, measurement configurations, and/or feedback resource configurations, each of which may be independent. Such configurations may be implemented in a semi-static manner, for example, via higher-layer signaling. A WTRU may have a set of reference measurement resources, a set of measurement configurations, and/or a set of feedback resources. Such a WTRU may be configured, for example dynamically, to associate one element from each such set (e.g., one reference measurement resource, one measurement configuration, and one feedback resource) with a measurement reporting process and/or a measurement report.

A WTRU may be configured with at least two RMRs that each may span different and, in some examples, disjoint resource elements (for exemplary purposes, RMR A and RMR B may be referred to herein as examples of two of such at least two RMRs). Such a WTRU may be configured, e.g., with two measurement configurations (e.g., a first measurement configuration "1" for long-term CSI reporting and tied to a first set of measurement reporting triggers, and a second measurement configuration "2" for short-term CSI reporting tied to a second set of measurement reporting triggers). Such a WTRU may be configured e.g., with at least three feedback resources (for exemplary purposes, X, Y, and Z may be referred to herein as examples of three of such at least three feedback resources. Each such feedback resource may include or indicate reporting occasions and/or time/frequency/code/beam resources that may differ from reporting occasions and/or time/frequency/code/beam resources indicated in another such feedback resource.

Such a WTRU may be indicated or instructed, dynamically and/or via a higher layer signal, to combine one or more resource elements, measurement configurations, and/or feedback resources. Such a combination may be referred to as a measurement reporting process. In an example, a WTRU may be configured to combine RMR A, measurement configuration 2, and feedback resource Y into a measurement reporting process. Validity of such a measurement reporting process may be applicable to a single occurrence of an RMR transmission, measurement occurrence, and/or feedback transmission. Alternatively, validity of such a measurement reporting process may be applicable to multiple occurrences of each of an RMR transmission, a measurement occurrence, and/or a feedback transmission (e.g., in a semi-persistent manner).

A configuration or indication of a measurement reporting process may indicate whether such a measurement reporting process may be one shot (e.g., a one-time measurement resource, measurement configuration, and/or feedback report or any combination thereof), multi-shot (e.g., a set of multiple measurement resources, measurement configurations, and/or feedback reports or combination thereof), or periodic (e.g., multiple periodic measurement resources, measurement configurations, and/or feedback reports or combination thereof, each of which may be valid and/or used until further reconfiguration). A configuration or indication of such a measurement reporting process may also, or instead, indicate an activation or deactivation of a multi-shot or periodic process.

A WTRU may be configured to perform one or more measurements on one or more RMRs. Such a WTRU may be configured with one or more triggers that the WTRU may use to determine whether such one or more measurements may be fed back. A measurement feedback trigger may be based on an associated measurement. In an example, a measurement feedback trigger may be based on whether an associated measurement value may meet or exceed an offset and/or a threshold value. In an example, a measurement feedback trigger may be based on whether an associated measurement value meets or may be superior or inferior to another measurement value (e.g., a measurement value that may be obtained from another RMR), in some examples, in addition to an offset.

Trigger criteria may be evaluated per RMR or set of RMRs. In an example, trigger criteria may be evaluated for some or all RMRs activated and/or associated with a given TRP, TRPG, system signature, cell, and/or WTRU. A WTRU may initiate a transmission of feedback when a measured offset for a first RMR may become "better" than, or otherwise favorably compares to, a measured offset of a second RMR, in an example, by an offset value. Such a first RMR and a second RMR may be associated with a same TRP and/or cell.

Such one or more measurements, triggers, and/or evaluations may be used, e.g., for a purpose of link adaptation. A WTRU may initiate transmission of feedback when a first RMR may have a measured offset that may meet or exceed a threshold and/or when the first RMR's measured offset may be "better" than, or otherwise favorably compare to, a measured offset for a second RMR. Such a first RMR may be associated with a first TRP or set of TRPs (e.g., a first system signature). Such a second RMR may be associated with a serving TRP or set of serving TRPs (e.g., a second system signature). Such feedback may be used for a purpose of network-controlled mobility.

Such one or more measurements, triggers, and/or evaluations may be used, e.g., to determine whether a TB may have been successfully decoded. A WTRU may be configured to perform one or more measurements on an RMR and may feed back such one or more measurements if the WTRU determines (e.g. using such one or more measurements, triggers, and/or evaluations) that a TB may not have been decoded properly and/or that a NACK may have been required. In an example, such feedback may facilitate a TRP in performing link adaptation, e.g., for a retransmission of the TB.

An RMR may reuse one or more resources that may have been used for transmission of a TB. A WTRU may use one or more data REs to perform one or more measurements. Such a WTRU may be triggered to feed back one or more measurements if the WTRU determines that the TB may have been decoded properly, e.g., to ensure the validity of such one or more measurements.

A WTRU may initiate a mobility-related procedure instead of, or in addition to, a transmission of uplink feedback. Such an initiation of a mobility-related procedure may be based on one or more measurements, triggers, and/or evaluations as set forth herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU), comprising:
   a processor configured to:
   receive resource configuration information, wherein the resource configuration information includes information regarding reference signals that are to be used for reference signal measurement;
   receive measurement configuration information, wherein
      the measurement configuration information indicates a feedback report to be generated by the WTRU;
      the measurement configuration information indicates one or more types of measurements among a plurality of different measurement types to be reported in the feedback report, the plurality of different measurement types including a channel measurement and a reference signal received power (RSRP) measurement; and
      the measurement configuration information indicates a respective subset of the reference signals to be used to perform each of the one or more types of measurements;
   determine, based on the measurement configuration information, whether each of the one or more types of measurements is to be reported at a wideband level or a subband level;
   generate the feedback report based on the measurement configuration information; and
   transmit the feedback report to a network entity.

2. The WTRU of claim 1, wherein the plurality of different measurement types includes a radio link monitoring (RLM) measurement.

3. The WTRU of claim 1, wherein the processor is further configured to determine whether the subset of the reference signals to be used to perform the each of the one or more types of measurements is activated or deactivated, and to perform the each of the one or more types of measurements based on the determination.

4. The WTRU of claim 3, wherein the subset of the reference signals comprises a semi-persistent reference signal.

5. The WTRU of claim 3, wherein the processor is configured to determine whether the subset of the reference signals is activated or deactivated based on downlink control information (DCI).

6. The WTRU of claim 3, wherein the processor is configured to determine whether the subset of the reference signals is activated or deactivated based on a media access control (MAC) control element (CE).

7. The WTRU of claim 3, wherein the subset of the reference signals comprises a channel state information reference signal (CSI-RS).

8. The WTRU of claim 1, wherein the channel measurement includes one or more of a channel quality indication (CQI) measurement, a rank indication (RI) measurement, or a precoder matrix indicator (PMI) measurement.

9. The WTRU of claim 1, wherein the subset of the reference signals to be used to perform the each of the one or more types of measurements comprises a non-zero power reference signal.

10. A method implemented in a wireless transmit/receive unit (WTRU), the method comprising:
    receiving resource configuration information, wherein the resource configuration information includes information regarding reference signals that are to be used for reference signal measurement;
    receiving measurement configuration information, wherein
       the measurement configuration information indicates a feedback report to be generated by the WTRU;
       the measurement configuration information indicates one or more types of measurements among a plurality of different measurement types to be reported in the feedback report, the plurality of different measurement types including a channel measurement and a reference signal received power (RSRP) measurement; and
       the measurement configuration information indicates a respective subset of the reference signals to be used to perform each of one or more types of measurements;
    determining, based on the measurement configuration information, whether each of the one or more types of measurements is to be reported at a wideband level or a subband level;
    generating the feedback report based on the measurement configuration information; and
    sending the feedback report to a network entity.

11. The method of claim 10, wherein the plurality of different measurement types includes a radio link monitoring (RLM) measurement.

12. The method of claim 10, further comprising determining whether the subset of the reference signals to be used to perform the each of the one or more types of measurements is activated or deactivated, and performing the each of the one or more types of measurements based on the determination.

13. The method of claim 12, wherein the subset of the reference signals comprises a channel state information reference signal (CSI-RS).

14. The method of claim 10, wherein the subset of the reference signals to be used to perform the each of the one or more types of measurements comprises a semi-persistent reference signal.

15. The method of claim 10, wherein the subset of the reference signals to be used to perform the each of the one or more types of measurements comprises a non-zero power reference signal.

16. A wireless transmit/receive unit (WTRU), comprising:
a processor configured to:
receive resource configuration information, wherein the resource configuration information includes information regarding one or more sets of reference signals that are to be used to perform reference signal measurement and respective purposes of the one or more sets of reference signals;
receive measurement configuration information, wherein the measurement configuration information indicates one or more types of measurements among a plurality of different measurement types to be performed by the WTRU and which of the one or more sets of reference signals is to be used to perform each of the one or more types of measurements, the plurality of different measurement types including a channel state information (CSI) measurement and a reference signal received power (RSRP) measurement;
perform measurement in accordance with the resource configuration information and the measurement configuration information; and
report the measurement to a network entity in a periodic, aperiodic or semi-persistent manner, wherein the measurement is reported at a wideband level or a subband level based on the measurement configuration information.

* * * * *